US012216949B2

(12) United States Patent
Uchiyama et al.

(10) Patent No.: US 12,216,949 B2
(45) Date of Patent: Feb. 4, 2025

(54) IMAGE FORMING APPARATUS, NON-TRANSITORY COMPUTER READABLE MEDIUM, AND IMAGE FORMING METHOD

(71) Applicant: FUJIFILM Business Innovation Corp., Tokyo (JP)

(72) Inventors: Kazunobu Uchiyama, Kanagawa (JP); Takumi Nishikata, Kanagawa (JP); Eiichi Waida, Kanagawa (JP); Yusuke Chika, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 351 days.

(21) Appl. No.: 17/712,817

(22) Filed: Apr. 4, 2022

(65) Prior Publication Data

US 2023/0096828 A1 Mar. 30, 2023

(30) Foreign Application Priority Data

Sep. 28, 2021 (JP) ................................. 2021-157835

(51) Int. Cl.
*G06F 3/12* (2006.01)
*H04N 1/00* (2006.01)
(52) U.S. Cl.
CPC .......... *G06F 3/1242* (2013.01); *G06F 3/1205* (2013.01); *G06F 3/1208* (2013.01); *H04N 1/0048* (2013.01)

(58) Field of Classification Search
None
See application file for complete search history.

(56) References Cited

U.S. PATENT DOCUMENTS 10,713,797 B2 * 7/2020 Iwamoto .................... G06T 7/20

FOREIGN PATENT DOCUMENTS

| JP | 2003-125155 A | 4/2003 |
| JP | 2020-170038 A | 10/2020 |

* cited by examiner

*Primary Examiner* — Helen Zong
(74) *Attorney, Agent, or Firm* — Oliff PLC

(57) ABSTRACT

An image forming apparatus including a first processor configured to control a first image former that forms a first image using a color material having a first color composition and a second processor configured to control a second image former that forms, using a color material having a second color composition, a second image to be superimposed on the first image. The first processor is configured to cause the first image former to form the first image in accordance with a first image formation instruction, corresponding to the first color composition, out of the image formation instruction and the first different image formation instruction, and transmit to the second processor a second image formation instruction corresponding to the second color composition. The second processor is configured to cause the second image former to form the second image in accordance with the second image formation instruction.

9 Claims, 16 Drawing Sheets

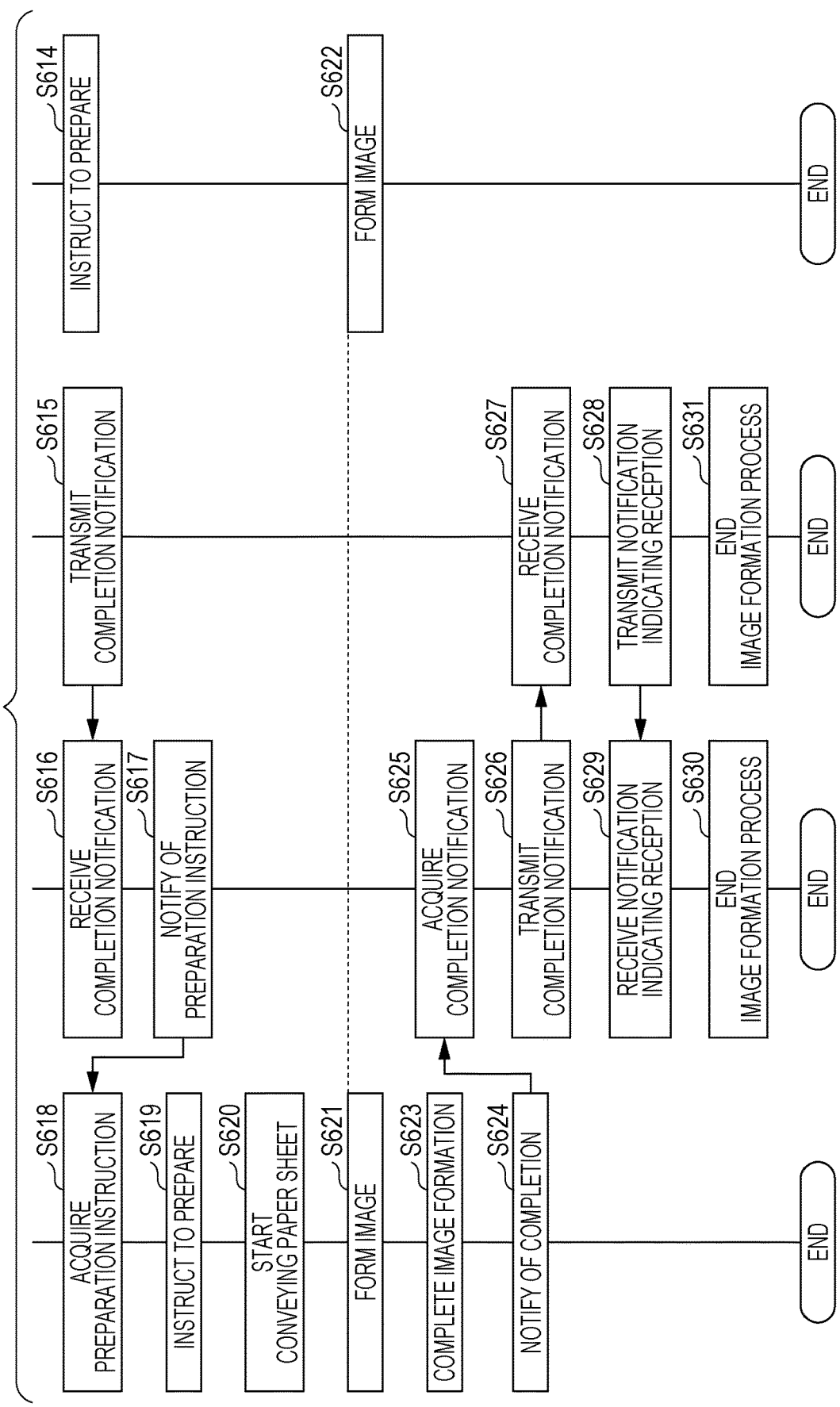

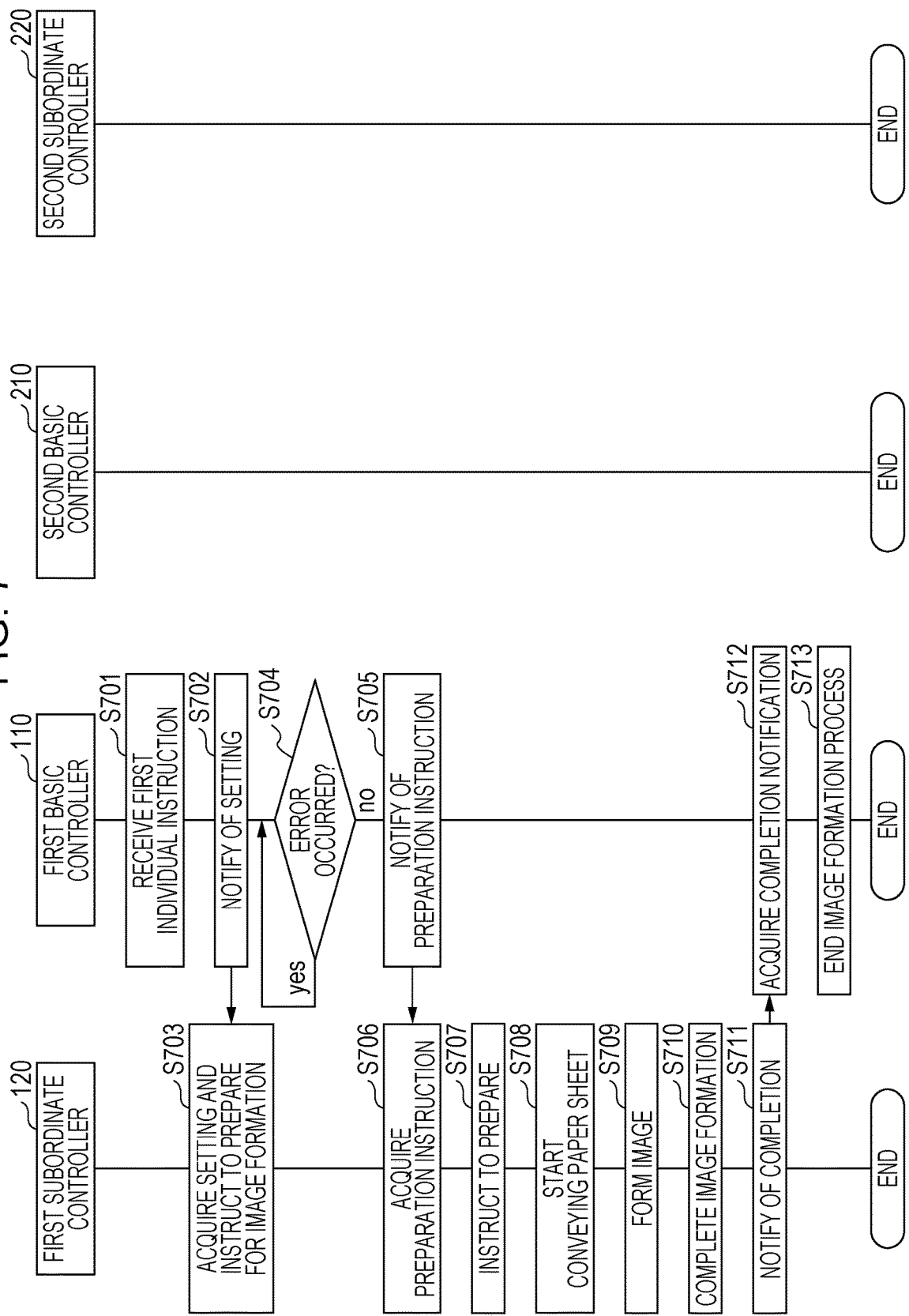

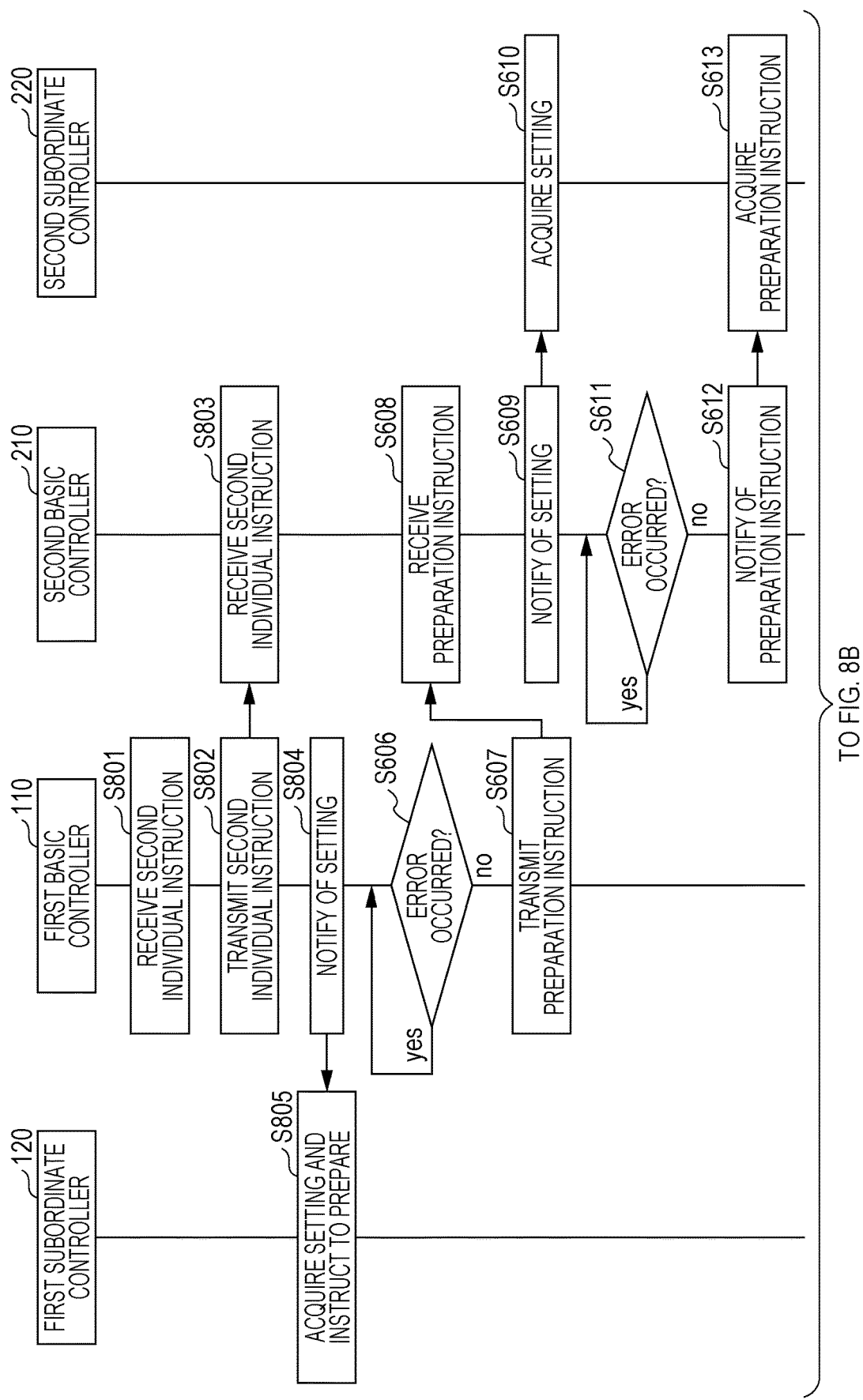

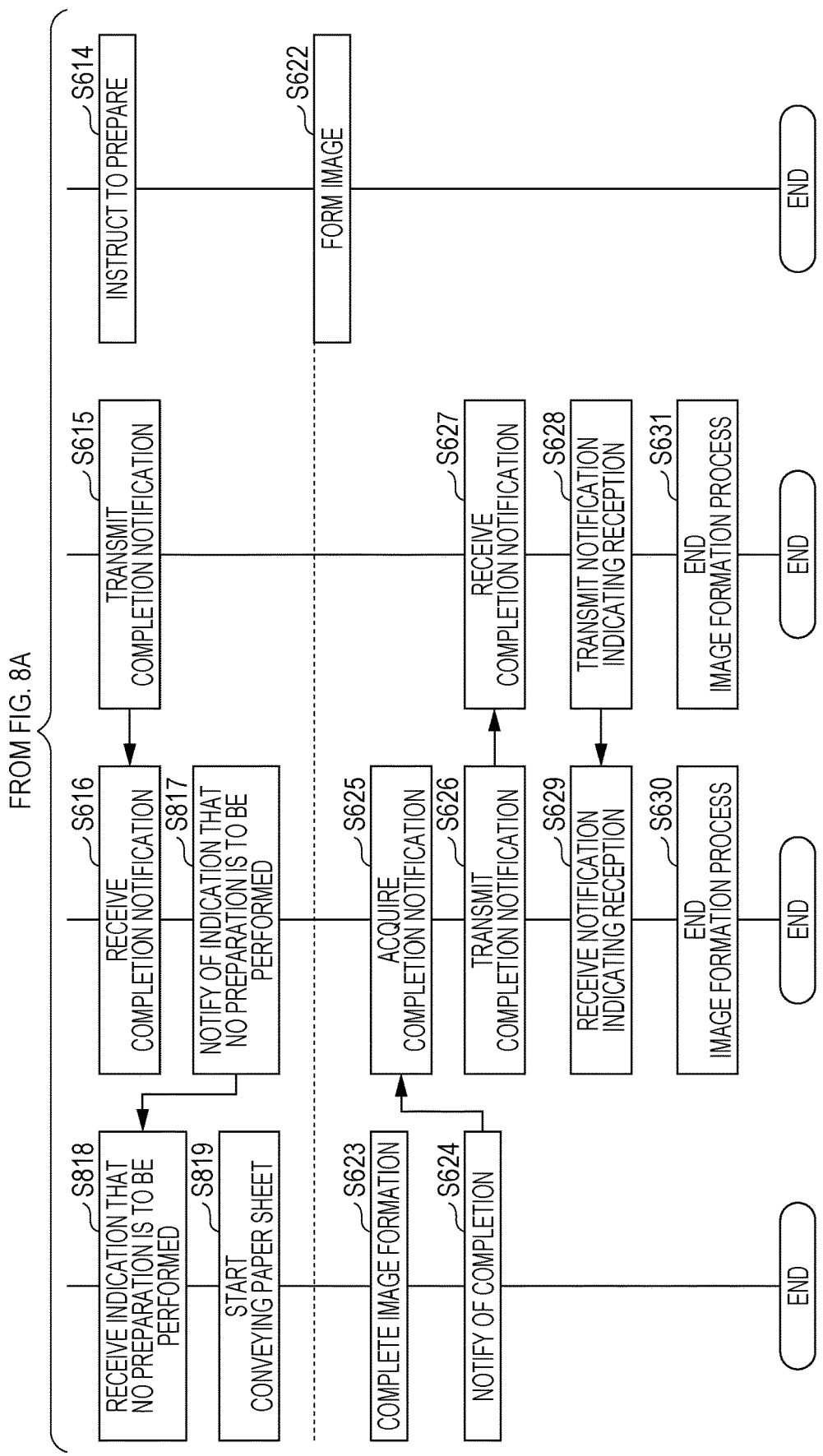

FIG. 9A

PC FOR TANAKA 123456 20210903111505 ← FIRST IMAGE FORMATION INSTRUCTION
PC FOR TANAKA 123456 20210903111505 ← SECOND IMAGE FORMATION INSTRUCTION

INFORMATION ON TERMINAL APPARATUS | USER IDENTIFICATION INFORMATION | TIME INFORMATION

FIG. 9B

PC FOR TANAKA 123456 20210903111505 ← FIRST IMAGE FORMATION INSTRUCTION
PC FOR TANAKA 123456 20210903111811 ← SECOND IMAGE FORMATION INSTRUCTION

FIG. 9C

PC FOR TANAKA 123456 20210903111715 ← FIRST IMAGE FORMATION INSTRUCTION
SHARED PC     123456 20210903112025 ← SECOND IMAGE FORMATION INSTRUCTION

FIG. 10A

| USER IDENTIFICATION INFORMATION | IRREGULARITY-CASE OPERATION | WAIT TIME | EXCESS-WAIT-TIME OPERATION |
|---|---|---|---|
| 123456 | NOTIFY USER AFTER SUSPENDING IMAGE FORMATION | 5 MINUTES | NOTIFY USER AFTER SUSPENDING IMAGE FORMATION |
| 987654 | PROCESS COOPERATION INSTRUCTION AS INDIVIDUAL INSTRUCTION | 10 MINUTES | PROCESS COOPERATION INSTRUCTION AS INDIVIDUAL INSTRUCTION |
| ... | ... | ... | ... |

FIG. 10B

| UNREGISTERED-CASE OPERATION |
|---|
| NOTIFY USER AFTER SUSPENDING IMAGE FORMATION |

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2021-157835 filed Sep. 28, 2021.

BACKGROUND

(i) Technical Field

The present disclosure relates to an image forming apparatus, non-transitory computer readable medium, and image forming method.

(ii) Related Art

Techniques of forming an image on a single paper sheet with two image formers are disclosed. For example, Japanese Unexamined Patent Application Publication No. 2020-170038 discloses an image forming apparatus that includes in a single housing a first image former forming a first image, second image former forming a second image, first controller controlling the first image former and second controller controlling the second image former. The image forming apparatus superimposes the first image and second image onto the single paper sheet.

The image forming apparatus disclosed in Japanese Unexamined Patent Application Publication No. 2020-170038 superimposes the second image on the first image onto a single paper sheet. The first and second controllers may recognize image formation instructions respectively corresponding to the two images to be superimposed. For example, a document or the like created by an application is divided and separated, forming the first image and second image and then the first image and second image are superimposed to each other. The image forming apparatus may recognize image formation instructions, respectively corresponding to the images to be superimposed, by referring to identification information related to the image formation instructions from the single application. However, if an image formation instruction used to form the first image and an image formation instruction used to form the second image are created by different applications, the image forming apparatus may have a difficulty in identifying the image formation instructions about the two images to be superimposed, using the identification information on the image formation instruction.

SUMMARY

Aspects of non-limiting embodiments of the present disclosure relate to providing an image forming apparatus that superimpose two images even when two pieces of identification information on two image formation instructions instructing two images to be superimposed onto a single paper sheet are not identical to each other.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a first processor configured to control a first image former that forms a first image using a color material having a first color composition; and a second processor configured to control a second image former that forms, using a color material having a second color composition, a second image to be superimposed on the first image, wherein the first processor is configured to: if an image formation instruction, including information indicating that the first image and the second image are to be superimposed to each other is received, with a first different image formation instruction being received, the first different image formation instruction having identification information identical to identification information for the image formation instruction; cause the first image former to form the first image in accordance with a first image formation instruction, corresponding to the first color composition, out of the image formation instruction and the first different image formation instruction, and transmit to the second processor a second image formation instruction corresponding to the second color composition, and the second processor is configured to cause the second image former to form the second image in accordance with the second image formation instruction, and wherein the first processor is configured to: if the image formation instruction, including the information indicating that the first image and the second image are to be superimposed to each other, is received, with the first different image formation instruction having the identical identification information not being received, while with a second different formation instruction being received, the second different formation instruction having user identification information identical to user identification information that is on a user having transmitted the image formation instruction and is included in the image formation instruction; cause the first image former to form the first image in accordance with a first image formation instruction, corresponding to the first color composition, out of the image formation instruction and the second different image formation instruction; and transmit to the second processor a second image formation instruction corresponding to the second color composition, and the second processor is configured to cause the second image former to form the second image in accordance with the second image formation instruction.

BRIEF DESCRIPTION OF THE DRAWINGS

Exemplary embodiment of the present disclosure will be described in detail based on the following figures, wherein:

FIGS. 6A and 6B illustrate an example of a process performed by the first controller and second controller;

FIG. 7 illustrates an example of a process performed by the first controller when a first basic controller receives a first individual instruction;

FIGS. 8A and 8B illustrate an example of a process performed by the first and second controllers when the first basic controller receives a second individual instruction;

FIGS. 9A through 9C illustrate examples of identification information included in an image formation instruction;

FIGS. 10A and 10B illustrate examples of information stored on a memory;

DETAILED DESCRIPTION

Figure 1:
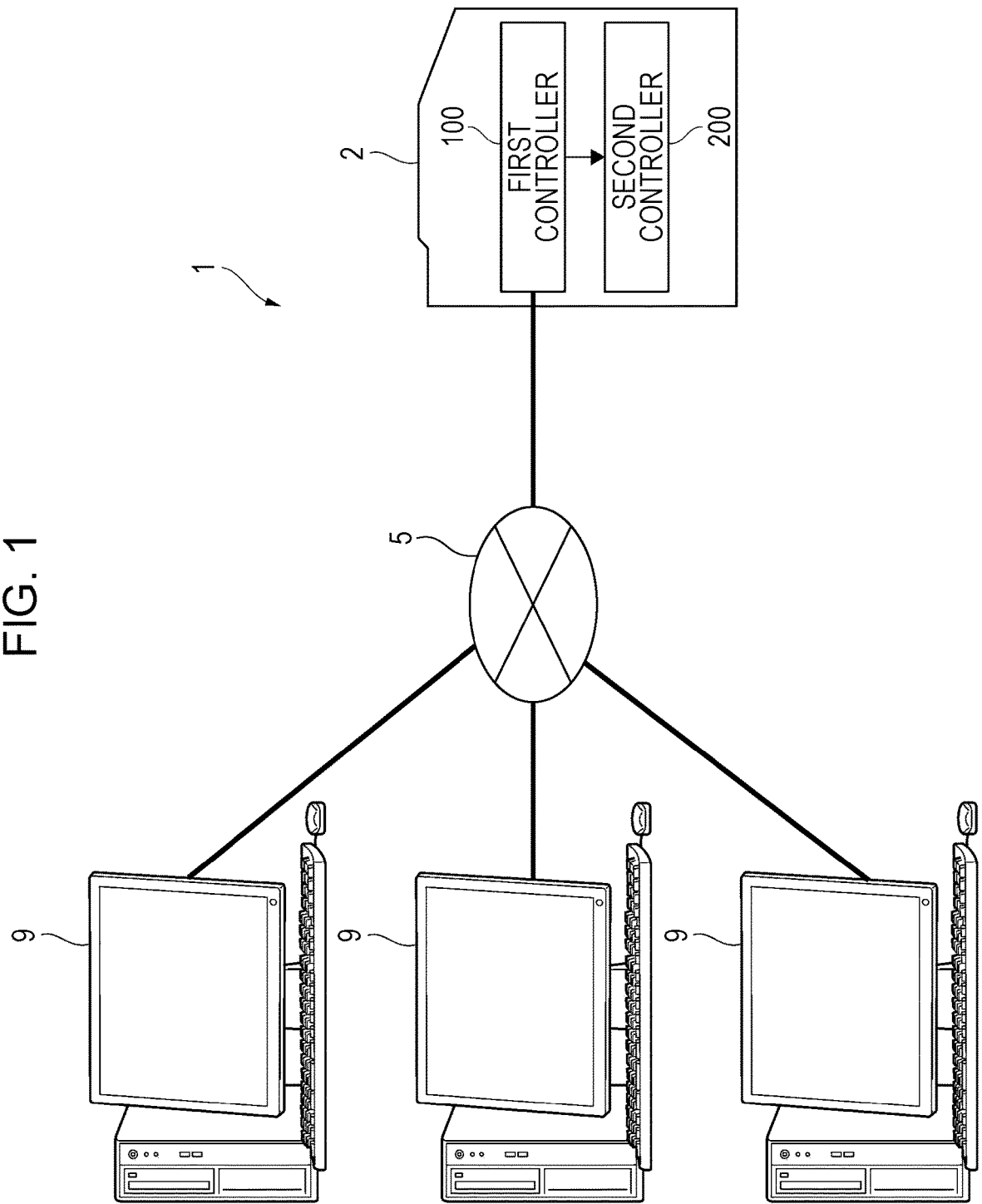
FIG. 1 illustrates an example of a configuration of an image forming system of an exemplary embodiment.
Figure 2:
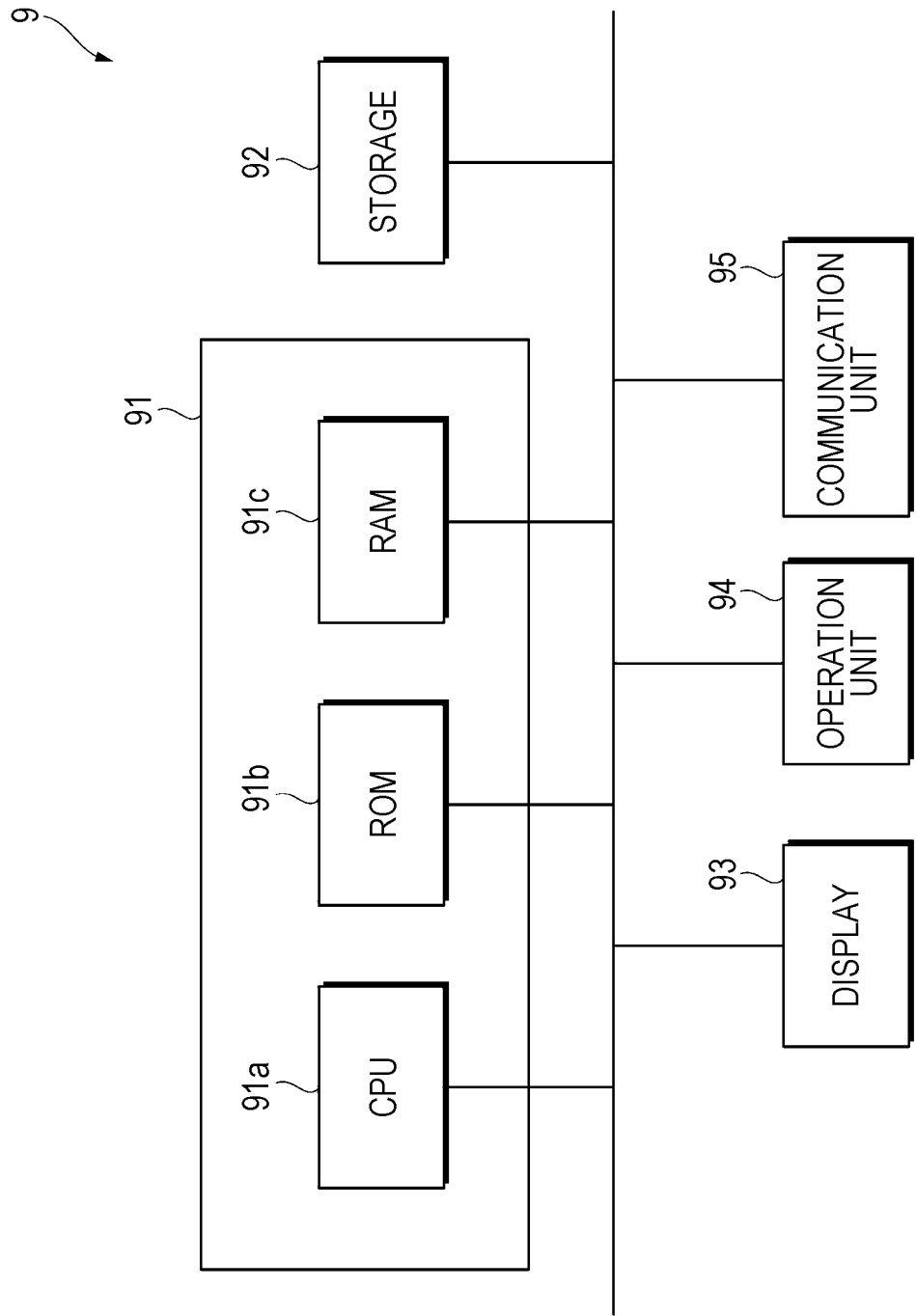
FIG. 2 illustrates an example of a hardware configuration of a terminal apparatus.
Figure 3:
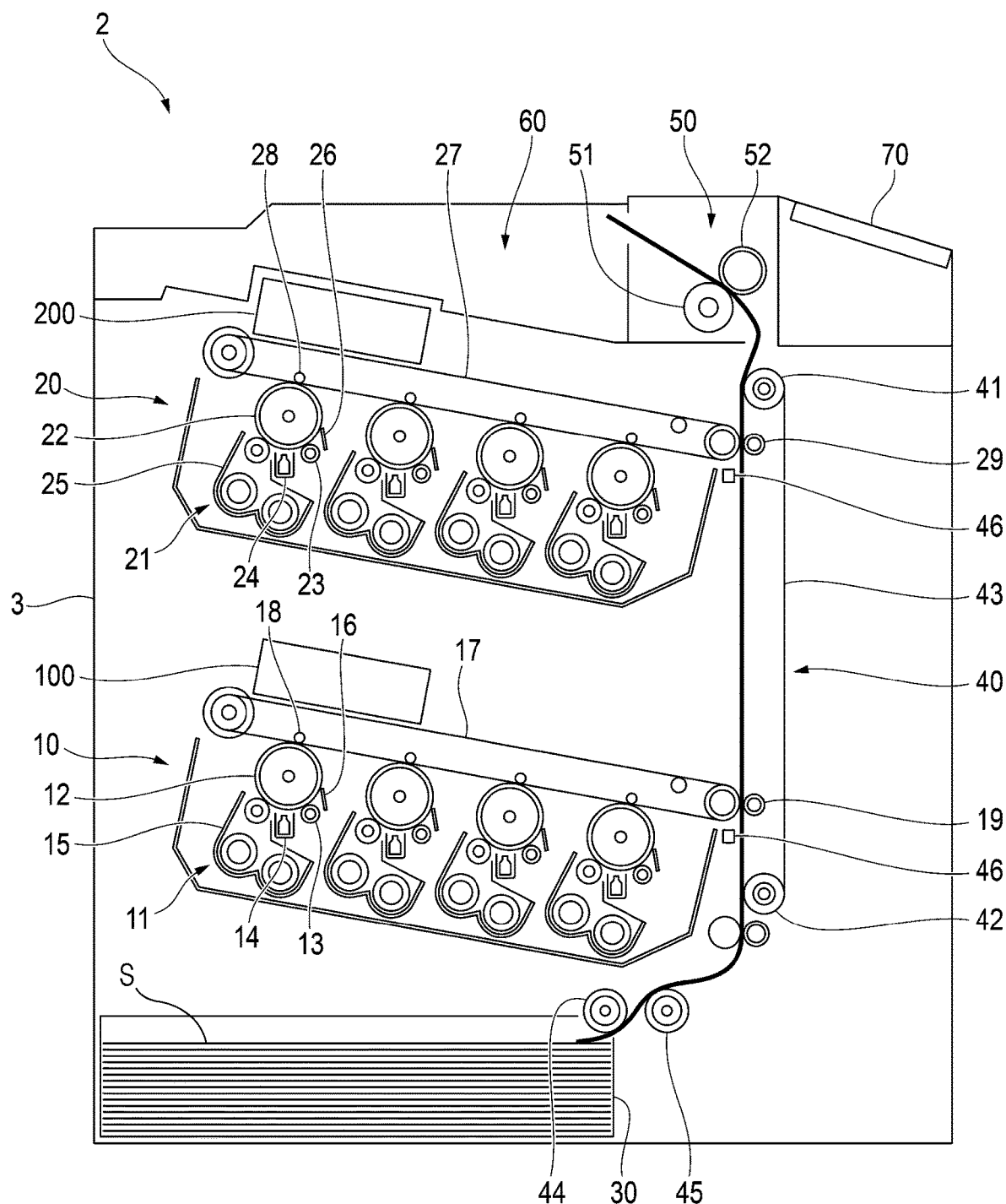
FIG. 3 illustrates an example of an internal structure of an image forming apparatus.
Figure 4:
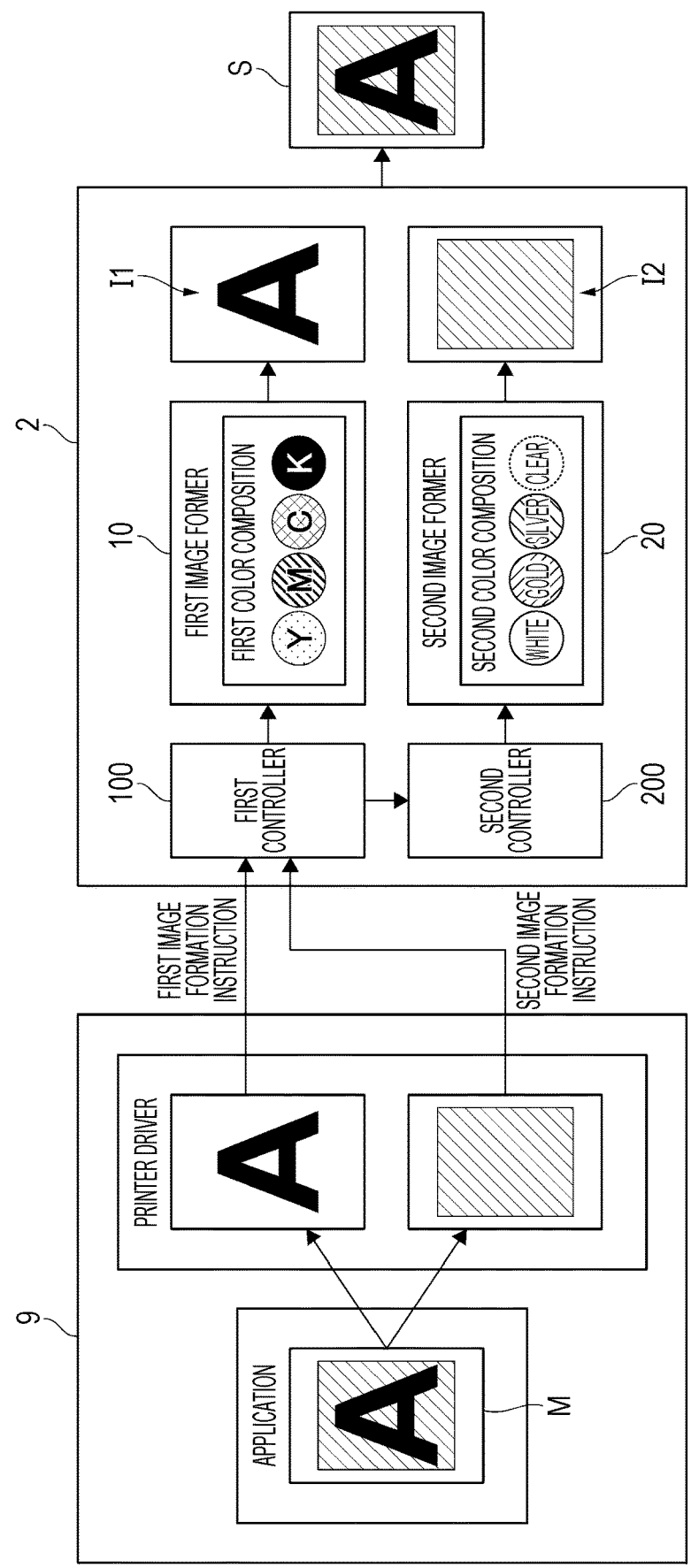
FIG. 4 illustrates an example of a functional configuration of the terminal apparatus and image forming apparatus.

Exemplary embodiment of the disclosure is described with reference to the attached drawings. FIG. 1 illustrates an example of a configuration of an image forming system 1 in accordance with the exemplary embodiment. FIG. 2 illustrates an example of a hardware configuration of a terminal apparatus 9. FIG. 3 illustrates an example of an internal structure of an image forming apparatus 2. FIG. 4 illustrates an example of a functional configuration of the terminal apparatus 9 and image forming apparatus 2. The image forming system 1 includes the image forming apparatus 2 and the terminal apparatuses 9 connected to the image forming apparatus 2 via a communication network 5. The communication network 5 is not limited to any type of network used for data communication between apparatuses. For example, the communication network 5 may include a wide-area network (WAN) and/or a local-area network (LAN). The communication network 5 may be a wired network, a wireless network, or a combination thereof. For example, wireless LAN may be WiFi (registered trademark).

The image forming apparatus 2 includes, in a single housing 3, two image formers forming images onto a single paper sheet S, namely, a first image former 10 and second image former 20, first controller 100 controlling the first image former 10, and second controller 200 controlling the second image former 20. In the image forming apparatus 2, the first controller 100 controls a paper conveyance device 40 that conveys the paper sheet S. The image forming apparatus 2 will be described below in greater detail.

Terminal Apparatus

The terminal apparatus 9 includes a controller 91 controlling the whole terminal apparatus 9, storage 92 used to store data, display 93 used to display an operation reception screen and an image, operation unit 94 used to receive an input operation from a user, and communication unit 95 used to communicate with the outside.

The controller 91 includes a central processing unit (CPU) 91a, read-only memory (ROM) 91b, and random-access memory (RAM) 91c. The ROM 91b stores a basic program (operating system) executed by the CPU 91a and a variety of settings. The CPU 91a utilizes the RAM 91c as a working area and executes an application program read from the ROM 91b or storage 92. Each element of the terminal apparatus 9 is controlled by the CPU 91a that executes the programs.

The storage 92 may be, for example, a semiconductor memory. The storage 92 stores application programs including a word-processing application and a printer driver. The storage 92 also stores compositions of colors utilized by the first image former 10 and second image former 20 in the image forming apparatus 2.

The word-processing application generates an instruction to form in a paper sheet S an image of an original document M that has been created using the word-processing application. The printer driver acquires the instruction to generate an image output from the application and converts the instruction into a command that may be analyzed by the image forming apparatus 2.

Specifically, after acquiring the image formation instruction of the original document M output from the application, the printer driver converts the image formation instruction into a first image formation instruction and second image formation instruction in view of characteristics of the first image former 10 and the second image former 20. The first image formation instruction serves as a command to form an image on the first image former 10 and the second image formation instruction serves as a command to form an image on the second image former 20. The printer driver then outputs the first image formation instruction and second image formation instruction to the first controller 100. The first image formation instruction and the second image formation instruction, if not differentiated from each other, are sometimes collectively referred to as an "image formation instruction."

The image formation instruction includes identification information identifying the image formation instruction, image data serving as data of an image to be formed, and a setting of image formation specified. The setting of the image formation indicates the size and material of the paper sheet S on which an image is to be formed, and a designate of color of a color material to be utilized. The image formation instruction includes information indicating whether the image formation instruction is a cooperation instruction or an individual instruction. For example, the identification information may include information on the terminal apparatus 9 from which the identification information has been output, user identification information serving as the identification information on a user, and time when the image formation instruction is output.

The user logs on the terminal apparatus 9 to start using the terminal apparatus 9. The terminal apparatus 9 identifies the identity and validity of the user and acquires qualification information on the user used to access an application or the like. The terminal apparatus 9 thus store the user identification information on the RAM 91c or the storage 92.

The printer driver reads the user identification information from the RAM 91c or the storage 92 to generate the image formation instruction and creates the image formation instruction that includes the user identification information attached to the information on the terminal apparatus 9 and time.

The display 93 displays a still image or a video. For example, the display 93 is a liquid-crystal display or an organic electroluminescent (EL) display.

The operation unit 94 is an input device that receives an operation from the user. For example, the operation unit 94 includes buttons, switches, and a touch panel. The communication unit 95 is, for example, a communication interface.

The terminal apparatus 9 thus constructed may be a notebook personal computer (PC), desktop PC, tablet PC, tablet terminal, multi-function cell phone (such as smart phone), cell phone (such as feature phone), or personal digital assistant (PDA).

Image Forming Apparatus

The image forming apparatus 2 includes the first image former 10 that forms an image on the paper sheet S serving as an example of a recording medium and the second image former 20 that forms an image on the paper sheet S. The image forming apparatus 2 further includes a paper sheet tray 30 that holds the paper sheet S, and paper conveyance device 40 that conveys the paper sheet S from the paper sheet tray 30 to the first image former 10. The image forming apparatus 2 further includes a fixing device 50, paper sheet discharge tray 60, and user interface (UI) 70. The fixing device 50 heats and presses a toner image on the paper sheet S to fix the toner image on the paper sheet S. The paper sheet discharge tray 60 receives and stacks the paper sheets S having images formed by the fixing device 50 that have fixed the toner images on the paper sheets S. The UI 70 displays information. The image forming apparatus 2 further includes the first controller 100 that controls the first image former 10, paper conveyance device 40, and fixing device 50, and the second controller 200 that controls the second image former 20.

The first image former 10 includes four image forming units 11 that are arranged side by side with regular intervals therebetween and form respective toner images of toner colors serving as color materials. Each image forming unit 11 includes a photoconductor drum 12 holding a toner image, charging device 13 that charges the surface of the photoconductor drum 12, and light-emitting diode (LED) print head 14 that forms an electrostatic latent image on the photoconductor drum 12 by exposing the photoconductor drum 12 charged by the charger 13 in accordance with image data of each color. Each image forming unit 11 includes a development device 15 that develops the electrostatic latent image on the photoconductor drum 12 with toner and drum cleaner 16 that cleans the photoconductor drum 12 after transferring. The development devices 15 in the four image forming units 11 of the exemplary embodiment respectively hold yellow (Y) toner, magenta (M) toner, cyan (C) toner, and black (K) toner and thus form respective color toner images. The composition of the toner colors (for example, yellow (Y), magenta (M), cyan (C), and black (K)) held by the four image forming units 11 in the first image former 10 may be referred to as a "first color composition."

The first image former 10 also includes an intermediate transfer belt 17 to which toner images formed by the photoconductor drums 12 in the image forming units 11 are transferred. The first image former 10 also includes first transfer rollers 18 and second transfer roller 19. The first transfer rollers 18 successively first-transfer to the intermediate transfer belt 17 the color toner images formed on the image forming units 11 (a first transfer operation). The second transfer roller 19 second-transfer the color toner images in batch, superimposed and transferred on the intermediate transfer belt 17, to the paper sheet S (a second transfer operation).

Like the first image former 10, the second image former 20 includes four image forming units 21, intermediate transfer belt 27, first transfer rollers 28, and second transfer roller 29. Like the image forming unit 11, each image forming unit 21 includes a photoconductor drum 22, charging device 23, LED print head 24, development device 25, and dry cleaner 26. The development devices 25 in the four image forming units 21 of the exemplary embodiment respectively hold white-colored, gold-colored, silver-colored and clear-colored toners and forms white-colored, gold-colored, silver-colored and clear-colored toner images. The colors of toner held by the development devices 25 in the image forming units 21 are not limited to the colors described above. The toner colors may be red, blue, and green. The composition of the toner colors (for example, white color, gold color, silver color, and clear color) held by the four image forming units 21 in the second image former 20 may be also referred to as a "second color composition."

The paper conveyance device 40 includes an upper roller 41 and lower roller 42 vertically spaced apart from each other and a conveyor belt 43 that is entrained about the upper roller 41 and lower roller 42. The paper conveyance device 40 further includes a feed roller 44 that feeds the paper sheet S at the paper sheet tray 30 toward the conveyor belt 43 and a conveyor roller 45 that is arranged between the feed roller 44 and conveyor belt 43. The paper conveyance device 40 also includes multiple sensors 46 that detect the passage of the paper sheet S conveyed.

The fixing device 50 includes a heat roller 51 that heats the incoming paper sheet S and belt module 52 that is pressed against the heat roller 51 and forms a pressure section with the heat roller 51. The fixing device 50 fixes the toner image onto the paper sheet S by pressing and heating the pressure section on the paper sheet S bearing the toner image.

The UI 70 is a touch panel that is a combination of a display, such as a liquid-crystal display or organic EL display, and a position input device, such as a touch pad. The UI 70 receives information from the user while also displaying information to the user.

The image forming apparatus 2 thus constructed operates as described below. Four color toner images formed on the photoconductor drums 12 in the image forming units 11 in the first image former 10 are first-transferred to the intermediate transfer belt 17 via the first transfer rollers 18 and a superimposed toner image in which four color toner images are superimposed is thus formed. As the intermediate transfer belt 17 moves, the superimposed toner image on the intermediate transfer belt 17 is conveyed to a second transfer section where the second transfer roller 19 is arranged.

The paper sheet S is fed to the second transfer section from the paper sheet tray 30 in synchronization with when the superimposed toner image in the first image former 10 is conveyed to the second transfer section. Electric field created by the second transfer roller 19 second-transfers the superimposed toner image in batch to the incoming paper sheet S in the second transfer section. The superimposed toner image formed by the first image former 10 is hereinafter referred to as a "first image I1."

Other four color toner images formed on the photoconductor drums 22 in the image forming units 21 in the second image former 20 are first-transferred to the intermediate transfer belt 27 by the first transfer rollers 28 and a superimposed toner image on which the other four color toner images are superimposed is formed on the intermediate transfer belt 27. As the intermediate transfer belt 27 moves, the superimposed toner image on the intermediate transfer belt 27 is conveyed to a second transfer section where the second transfer roller 29 is arranged.

The paper sheet S, having the superimposed toner image that has been electrostatic-transferred in the first image former 10, is fed to the second transfer section in synchronization with when the superimposed toner image in the second image former 20 is conveyed to the second transfer section. In the second transfer section, electric field created by the second transfer roller 29 second-transfers the superimposed toner images in batch on the incoming paper sheet S having the superimposed toner image that has been electrostatically transferred in the first image former 10. The superimposed toner image formed by the second image former 20 is hereinafter also referred to as a "second image I2."

A superimposed toner image on which the superimposed toner image in the first image former 10 and the superimposed toner image in the second image former 20 are superimposed is electrostatically transferred to the paper sheet S. The resulting paper sheet S is conveyed to the fixing device 50. The toner image on the paper sheet S conveyed to the fixing device 50 is heated and pressed by the fixing device 50 and is thus fixed onto the paper sheet S. The paper sheet S bearing the fixed image is conveyed to the paper sheet discharge tray 60 in the image forming apparatus 2.

Figure 5:
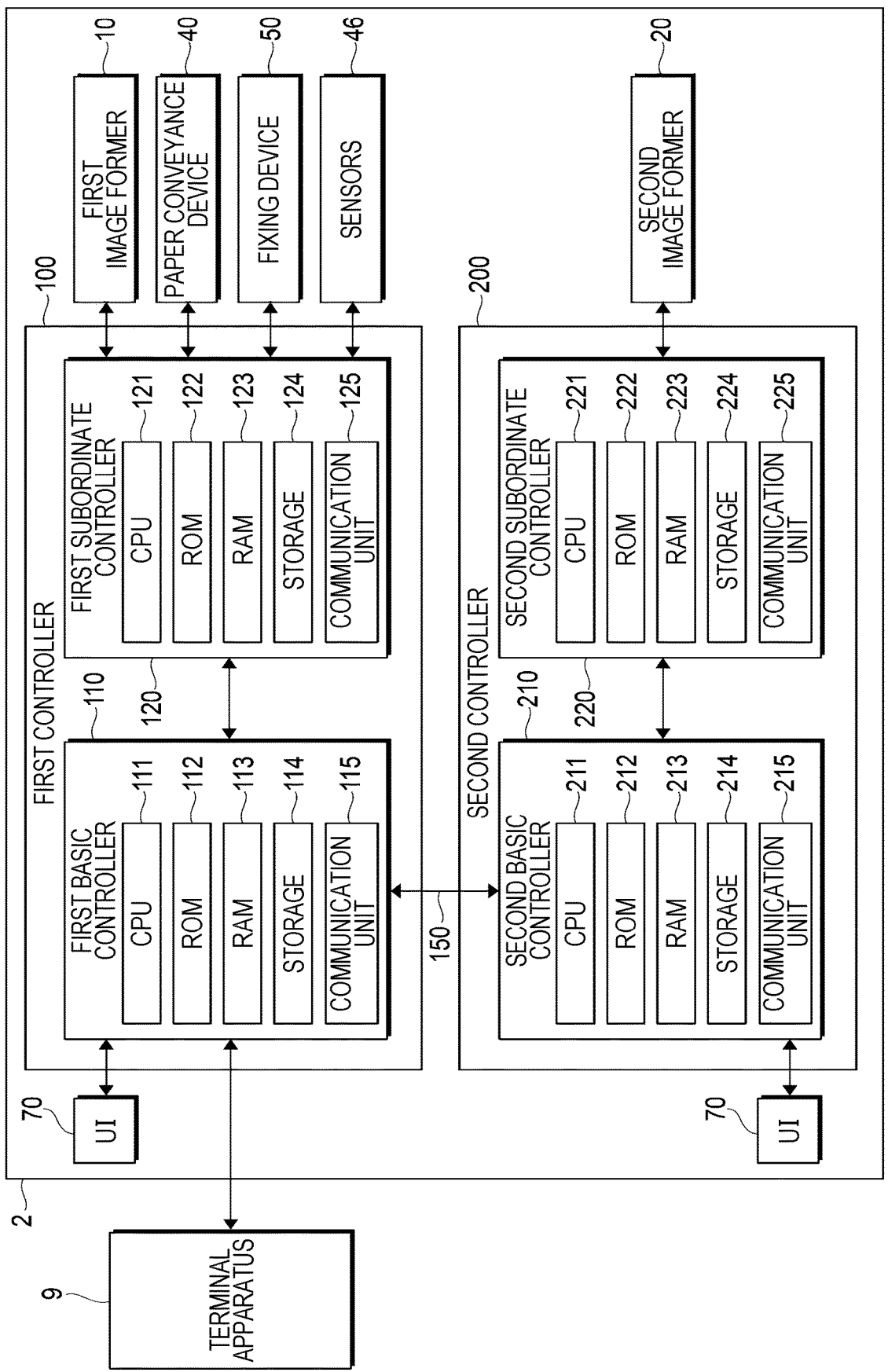
FIG. 5 is a block diagram illustrating an example of a hardware configuration of a first controller and second controller.

FIG. 5 illustrates an example of a hardware configuration of the first controller 100 and the second controller 200.

First Controller 100

The first controller 100 includes a first basic controller 110 that controls operations of the first image former 10, paper conveyance device 40, fixing device 50, and the like, and first subordinate controller 120 that controls, under the control of the first basic controller 110, the operations of the first image former 10, paper conveyance device 40, fixing device 50, and the like.

The first basic controller 110 includes a central processing unit (CPU) 111, read-only memory (ROM) 112, random-access memory (RAM) 113, storage 114, such as a semiconductor memory, and communication unit 115 used to communicate with the outside. The communication unit 115 is a communication interface.

The ROM 112 stores a basic program (operating system) executed by the CPU 111, and a variety of settings. The CPU 111 executes programs read from the ROM 112 or the storage 114 using the RAM 113 as a working area. The functions of the first basic controller 110 are performed as described below when the CPU 111 executes the program.

The first basic controller 110 transmits or receives information to or from the first subordinate controller 120, second controller 200 and UI 70 via the communication unit 115.

The first basic controller 110 also receives, via the communication unit 115, an image formation instruction from the outside, such as the terminal apparatus 9. The first basic controller 110 analyzes the received image formation instruction. The image formation instruction includes identification information, image data, setting of image formation, and information indicating whether the image formation instruction is a cooperation instruction or an individual instruction described below.

The first basic controller 110 performs a predetermined image processing operation on the received image data. The first basic controller 110 converts the image data into reproduction colors of the first image former 10, namely, toner colors of the first image former 10 (yellow (Y), magenta (M), cyan (C), and black (K)) as YMCK data and then outputs the YMCK data. The YMCK data includes Y color data, M color data, C color data, and K color data, separated color by color.

The first basic controller 110 notifies the first subordinate controller 120 of the size and material of the paper sheet S related to the received image formation instruction.

The first basic controller 110 also transfers the received image formation instruction to the second controller 200.

Like the first basic controller 110, the first subordinate controller 120 includes a CPU 121, ROM 122, RAM 123, storage 124, and communication unit 125. Using the RAM 123 as a working area, the CPU 121 executes a program read from the ROM 122 or the storage 124 and thus performs the functions of the first subordinate controller 120.

By exchanging control information with the first basic controller 110, the first subordinate controller 120 controls feeding and conveying operations of the paper sheet S and a toner image fixing operation of the fixing device 50 in synchronization with exposure, development, and transfer operations on the first image former 10 and a transfer timing of the paper conveyance device 40.

The first subordinate controller 120 acquires error information about the occurrence of an error, for example, the first image former 10 running out of toner or paper jamming on the paper conveyance device 40. The first subordinate controller 120 notifies the first basic controller 110 of these pieces of error information. The first basic controller 110 causes a display panel of the UI 70 to display the error information, thereby notifying the user of the error information. If the first image former 10 runs out of toner and toner is then replenished, the first subordinate controller 120 acquires information indicating that the error has been resolved. For example, if paper jamming indicated by the error information is resolved, the first subordinate controller 120 acquires information indicating that the error created has been resolved. The first subordinate controller 120 then notifies the first basic controller 110 of the elimination of the error. The first basic controller 110 notifies the user of the elimination of the error by displaying the elimination of the error on the display panel of the UI 70.

Second Controller 200

The second controller 200 includes a second basic controller 210 controlling the operation of the second image former 20 and second subordinate controller 220 controlling, under the control of the second basic controller 210, the operation of the second image former 20. The second basic controller 210 transmits or receives information to or from the first basic controller 110 via a connection line 150.

The second basic controller 210 includes a CPU 211, ROM 212, RAM 213, storage 214, such as a semiconductor memory, and communication unit 215 used to communicate with the outside.

The ROM 212 stores a basic program (such as an operating system) executed by the CPU 211. Using the RAM 213 as a working area, the CPU 211 executes a program read from the ROM 212 and the storage 214. The functions of the second basic controller 210 are performed when the CPU 211 executes the program.

The second basic controller 210 transmits or receives information to or from the second subordinate controller 220, first controller 100 and UI 70 via the communication unit 215.

The second basic controller 210 performs a predetermined image processing operation on the received image data. The second basic controller 210 converts the image data into reproduction colors of the second image former 20, namely, toner colors of the second image former 20 (white color, gold color, silver color, and clear color) as white-colored data, gold-colored data, silver-colored data, and clear-colored data, and outputs the resulting color data.

The second basic controller 210 also notifies the second subordinate controller 220 of the size and material of the paper sheet S related to the received image formation instruction.

The second subordinate controller 220 includes a CPU 221, ROM 222, RAM 223, storage 224, and communication unit 225. Using the RAM 223 as a working area, the CPU 221 executes a program read from the ROM 222 or storage 224, thereby performing the functions of the second subordinate controller 220.

By exchanging control information with the second basic controller 210, the second subordinate controller 220 controls the operations of the second image former 20 including exposure, development, and transfer.

The second subordinate controller 220 acquires error information about the occurrence of an error, for example, about the second image former 20 running out of toner. The second subordinate controller 220 notifies the second basic controller 210 of this piece of error information. The second basic controller 210 causes the display panel of the UI 70 to display the error information, thereby notifying the user of the error information. If the error indicates out of toner and toner is then replenished, the second subordinate controller 220 acquires information indicating that the error has been resolved. The second subordinate controller 220 notifies the second basic controller 210 of the elimination of the error. The second basic controller 210 notifies the user of the elimination of the error by causing the display panel of the UI 70 to display the elimination of the error.

Cooperation Between First Controller 100 and Second Controller 200

After startup, the first controller 100 and second controller 200 exchange information. The first image former 10 second-transfers the four-color superimposed toner image onto the paper sheet S conveyed by the paper conveyance device 40 that operates under the control of the first controller 100 while the second image former 20 second-transfers the other four-color toner image to the paper sheet S. The operation of the first image former 10 that performs the second transfer of the four-color superimposed toner image onto the paper sheet S is also stated as "the first image former 10 forms an image." Furthermore, the operation of the second image former 20 that performs the second transfer of the other four-color superimposed toner image onto the paper sheet S is also stated as "the second image former 20 forms an image."

The process performed by the first controller 100 and second controller 200 is described below. After acquiring an image formation instruction output from an application, the printer driver in the terminal apparatus 9 converts the image formation instruction into a command for the first basic controller 110 and second basic controller 210 if the image formation instruction is an instruction causing the first image former 10 and second image former 20 to form an image. The printer driver outputs the command to the first basic controller 110. The terminal apparatus 9 outputs the image formation instruction to the first basic controller 110. The image formation instruction causing the first image former 10 and second image former 20 to form an image is also referred to as a "cooperation instruction." The terminal apparatus 9 transmits the cooperation instruction to the first basic controller 110. The terminal apparatus 9 includes, in the cooperation instruction, information indicating that an image is to be formed on the first image former 10 and second image former 20.

The instruction output from the application may indicate that an image is to be formed on the first image former 10 but is not to be formed on the second image former 20 (for example, an instruction is that an image is to be formed using the toners of the first image former 10 without using the toners of the second image former 20 or the user instructs, using the printer driver on the terminal apparatus 9, image formation to be performed only on the first image former 10). In such a case, the printer driver in the terminal apparatus 9 converts the image formation instruction into the command for the first basic controller 110. The printer driver thus outputs the command to the first basic controller 110. In this way, the terminal apparatus 9 transmits the image formation instruction to the first basic controller 110. In the discussion that follows, the image formation instruction indicating that an image is to be formed on the first image former 10 but is not to be formed on the second image former 20 is hereinafter referred to as a "first individual instruction." The terminal apparatus 9 transmits the first individual instruction to the first basic controller 110. The terminal apparatus 9 includes, in the first individual instruction, information indicating that an image is to be formed on the first image former 10 but is not to be formed on the second image former 20.

The instruction output from the application may indicate that an image is to be formed on the second image former 20 but is not to be formed on the first image former 10 (for example, an instruction is that an image is to be formed using the toners on the second image former 20 without using the toners of the first image former 10 or the user instructs, using the printer driver on the terminal apparatus 9, image formation to be performed only on the second image former 20). In such a case, the printer driver in the terminal apparatus 9 converts the image formation instruction into the command for the first basic controller 110 and the second basic controller 210. The printer driver thus outputs the command to the first basic controller 110. If the image formation is to be performed on the second image former 20 but is not to be performed on the first image former 10, the first basic controller 110 may still control the paper conveyance device 40, fixing device 50, and the like. The printer driver thus converts the instruction output from the application into the command used for the first basic controller 110 to control the paper conveyance device 40, fixing device 50, and the like. The printer driver outputs the command to the first basic controller 110. The terminal apparatus 9 transmits the image formation instruction to the first basic controller 110. In the following discussion, the image formation instruction indicating that an image is to be formed on the second image former 20 and indicating that an image is not formed on the first image former 10 may be referred to as a "second individual instruction." The terminal apparatus 9 transmits the second individual instruction to the first basic controller 110. If the first individual instruction and second individual instruction, if not differentiated from each other, are simply referred to as an "individual instruction."

In accordance with information included in the image formation instruction from the terminal apparatus 9, the first basic controller 110 determines whether the image formation instruction is a cooperation instruction, first individual instruction, or second individual instruction. If the image formation instruction is a first individual instruction, the first basic controller 110 performs an image formation process responsive to the first individual instruction. If the image formation instruction is a second individual instruction, the first basic controller 110 transfers the second individual instruction to the second basic controller 210. The first basic controller 110 and second basic controller 210 perform the image formation process responsive to the second individual instruction. These processes are described below in greater detail.

If the image formation instruction is a cooperation instruction, the first basic controller 110 waits until another cooperation instruction having the same identification information arrives. The first basic controller 110 then transfers to the second basic controller 210 the cooperation instruction responsive to a used color material having a second color composition out of the two cooperation instructions having the same identification information. The first basic controller 110 and second basic controller 210 then perform the image formation process responsive to the cooperation instruction.

Figure 6A:
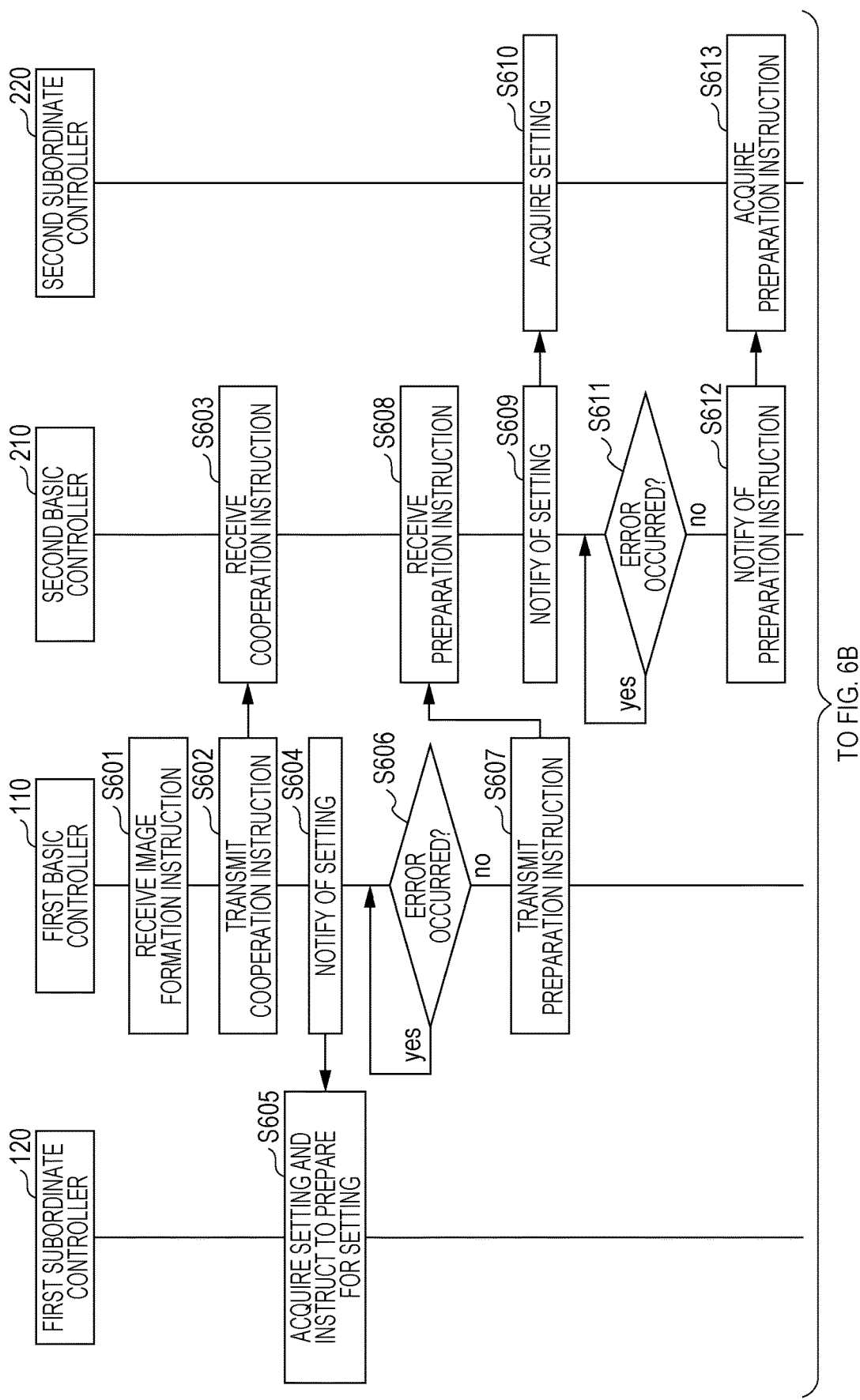

FIGS. 6A and 6B illustrate an example of the process performed by the first controller 100 and second controller 200. The process in FIGS. 6A and 6B is performed when the first controller 100 receives the cooperation instruction. Referring to FIGS. 6A and 6B, another cooperation instruction having the same (identical) identification information is received within a predetermined period of time from the reception of one cooperation instruction.

Upon receiving the image formation instruction from the terminal apparatus 9 via the communication unit 115, the first basic controller 110 verifies whether the image formation instruction is a cooperation instruction or an individual instruction (S601). If the image formation instruction is a cooperation instruction, the first basic controller 110 determines whether a cooperation instruction having the same identification information has been received within the predetermined period of time. If the first basic controller 110 determines that the cooperation instruction having the same identification information has been received, the first basic controller 110 transfers to the second basic controller 210 the cooperation instruction, with the used color material having the second color composition, out of the two cooperation instructions having the same identification information (S602). The second basic controller 210 receives the cooperation instruction from the first basic controller 110 (S603).

The first basic controller 110 notifies the first subordinate controller 120 of the setting of the specified image formation (S604). The first subordinate controller 120 acquires the setting of the image formation and instructs preparation for the image formation (S605). The preparation for the image formation includes an operation to make the paper conveyance device 40 ready to convey the paper sheet S (hereinafter referred to as "conveyance preparation") and, for example, includes starting motors that drive a variety of rollers including the feed roller 44. The preparation for the image formation also includes an operation to make the fixing device 50 ready to fix a toner image onto the paper sheet S and, for example, includes raising temperature of the heat roller 51.

The first basic controller 110 determines whether an error, such as the first image former 10 being running out of toner, or paper jamming, has occurred (S606). If no error has occurred (no path in S606), the first basic controller 110 transmits to the second basic controller 210 a preparation instruction indicating that the image formation preparation is to be performed on the second image former 20 (S607). On the other hand, if an error has occurred (yes path in S606), the first basic controller 110 waits on standby until the error is resolved.

The second basic controller 210 receives the preparation instruction from the first basic controller 110 (S608). The second basic controller 210 notifies the second subordinate controller 220 of the setting of the image formation (S609). In this way, the second subordinate controller 220 acquires the setting of the image formation (S610).

The second basic controller 210 determines whether an error, such as the second image former 20 running out of tonner, has occurred (S611). If no error has occurred (no path in S611), the second basic controller 210 notifies the second subordinate controller 220 of the preparation instruction indicating that the image formation preparation is to be performed on the second image former 20 (S612). After acquiring the preparation instruction (S613), the second subordinate controller 220 instructs the second image former 20 to prepare for the image formation (S614). The image formation preparation includes an operation to make the second image former 20 ready to form an image on the paper sheet S and, for example, includes warmup, image quality adjustment operation, and automatic disposal of deteriorated toner of the development device 25. Each of these operations involves consuming power or consuming toner. Upon completing the image formation preparation, the second image former 20 shifts to a standby state. If an error has occurred (yes path in S611), the second basic controller 210 waits on standby until the error is resolved.

When the information formation preparation of the second image former 20 is complete, the second basic controller 210 transmits to the first basic controller 110 a completion notification indicating that the preparation is complete (S615). If the second basic controller 210 receives the notification of the preparation completion from the second image former 20 after the second subordinate controller 220 instructs to prepare for the image formation (S614), the second basic controller 210 may determine that the image formation preparation of the second image former 20 is complete. If a predetermined period of time has elapsed since the instruction of the second subordinate controller 220 for the image formation preparation (S614), the second basic controller 210 may determine that the image formation preparation of the second image former 20 is complete.

After receiving the completion notification from the second basic controller 210 (S616), the first basic controller 110 notifies the first subordinate controller 120 of a preparation instruction indicating that the image formation preparation of the first image former 10 is to be performed (S617). After acquiring the preparation instruction (S618), the first subordinate controller 120 instructs the first image former 10 to prepare for the image formation (S619). The image formation preparation may include warmup, image quality adjustment operation, and automatic disposal of deteriorated toner of the development device 15. Upon completing the image formation preparation, the first image former 10 shifts to a standby state.

When the image formation preparation of the first image former 10 is complete, the first subordinate controller 120 causes the paper conveyance device 40 to start conveying the paper sheet S (S620) and causes the first image former 10 to form an image on the incoming paper sheet S (S621). If the first basic controller 110 receives the notification of the preparation completion after instructing the image formation preparation (S617), the first basic controller 110 may determine that the image formation preparation of the first image former 10 is complete. If a predetermined period of time has elapsed since instructing the image formation preparation (S617), the first basic controller 110 may determine that the image formation preparation of the first image former 10 is complete.

The second subordinate controller 220 causes the second image former 20 to form an image on the incoming paper sheet S (S622).

The first subordinate controller 120 causes the fixing device 50 to fix the toner image onto the incoming paper sheet S, and completes the image formation by discharging the paper sheet S having undergone fixing into the paper sheet discharge tray 60 (S623).

The first subordinate controller 120 notifies the first basic controller 110 of a notification that the image formation is complete (S624). After acquiring the completion notification (S625), the first basic controller 110 transmits to the second basic controller 210 the completion notification indicating the completion of the image formation (S626).

After receiving the completion notification (S627), the second basic controller 210 transmits to the first basic controller 110 a notification that the completion notification has been received (S628).

After receiving the notification that the completion notification has been received (S629), the first basic controller 110 ends the image formation process (S630). The end of the image formation process includes the end of the formation operation of the toner image on the first image former 10 and a deletion operation deleting information related to the image formation at the present cycle and stored on the RAM 113 or the storage 114.

The second basic controller 210 ends the image formation process (S631) after transmitting to the first basic controller 110 the notification that the completion notification has been received (S628). The end of the image formation process includes the end of the formation of the toner image on the second image former 20 and the deletion operation deleting information related to the image formation at the present cycle and stored on the RAM 213 or the storage 214.

According to the exemplary embodiment, the image formation is performed with the first controller 100 and second controller 200 operating in cooperation.

For example, if no error has occurred in the first image former 10 and the paper conveyance device 40, serving as a control target of the first basic controller 110, the first basic controller 110 transmits to the second basic controller 210 the preparation instruction indicating that the image formation preparation of the second image former 20 is to be performed (S607). If no error has occurred on the second image former 20, serving as a control target of the second basic controller 210, after the preparation instruction is received (S608), the second basic controller 210 notifies the second subordinate controller 220 of the preparation instruction indicating that the image formation preparation of the second image former 20 is to be performed (S612). When the image formation preparation of the second image former 20 is complete, the second basic controller 210 transmits to the first basic controller 110 the completion notification indicating that the preparation is complete (S615). After receiving the completion notification (S616), the first basic controller 110 notifies the first subordinate controller 120 of the preparation instruction indicating that the image formation preparation of the first image former 10 is to be performed (S617).

If the first controller 100 and second controller 200 do not cooperate but operate independently from each other, a time lag may occur between the image formation process start timing in the first image former 10 and the image formation process start timing in the second image former 20. The arrangement described above may control such a timing problem. For example, although the image formation preparation of the second image former 20 is unfinished, the paper conveyance on the paper conveyance device 40 or the image formation process on the first image former 10 may start, leading to causing the image formation process on the second image former 20 to be not in time. The arrangement described above may control such a timing problem.

Power may be wasted if the second image former 20 may be left in a standby state for a longer period of time with an error present on the first image former 10 or the paper conveyance device 40. The arrangement described above may control such waste of power. Power may be wasted if the first image former 10 may be left in a standby state for a longer period of time with an error present on the second image former 20. The arrangement described above may control such waste of power.

According to the exemplary embodiment, when the image formation is complete, the first basic controller 110 transmits to the second basic controller 210 the completion notification indicating that the image formation is complete (S626). After receiving the completion notification (S627), the second basic controller 210 transmits to the first basic controller 110 the notification that the completion notification has been received (S628).

In this way, the arrangement described above may control the situation that the second controller 200 goes unnoticed of the completion of the image formation after the fixing operation on the fixing device 50.

Process Performed in Response to Reception of First Individual Instruction

FIG. 7 illustrates an example of the process performed by the first controller 100 and second controller 200 when the first basic controller 110 receives the first individual instruction.

When the first individual instruction is received (S701), the first basic controller 110 notifies the first subordinate controller 120 of the setting of the image formation responsive to the first individual instruction (S702). In this way, the first subordinate controller 120 acquires the setting of the image formation responsive to the first individual instruction and instructs to prepare for the image formation (S703). The first basic controller 110 then determines whether an error has occurred (S704). If an error has occurred (yes path in S704), the first basic controller 110 waits until the error is resolved. On the other hand, if no error has occurred (no path in S704), the first basic controller 110 notifies the first subordinate controller 120 of a preparation instruction indicating that the image formation preparation of the first image former 10 is to be performed in response to the individual instruction (S705).

After acquiring the preparation instruction (S706), the first subordinate controller 120 instructs the first image former 10 to prepare for the image formation (S707). When the image formation preparation of the first image former 10 is complete, the first subordinate controller 120 causes the paper conveyance device 40 to start conveying the paper sheet S (S708) and causes the first image former 10 to form an image on the incoming paper sheet S (S709). The first subordinate controller 120 causes the fixing device 50 to fix a toner image onto the incoming paper sheet S and completes the image formation by discharging the paper sheet S having undergone the fixing to the paper sheet discharge tray 60 (S710). The first subordinate controller 120 notifies the first basic controller 110 of a notification that the image formation is complete (S711). After acquiring the completion notification (S712), the first basic controller 110 ends the image formation process (S713).

Process Performed in Response to Reception of Second Individual Instruction

FIGS. 8A and 8B illustrate an example of a process performed by the first controller 100 and second controller 200 when the first basic controller 110 receives the second individual instruction. Referring to FIGS. 8A and 8B, like operations in FIGS. 6A and 6B are designated with like reference numerals and the discussion thereof is omitted herein.

Upon receiving the second individual instruction (S801), the first basic controller 110 transmits the second individual instruction to the second basic controller 210 via the connection line 150 (S802). The second basic controller 210 receives the second individual instruction from the first basic controller 110 (S803). The first basic controller 110 notifies the first subordinate controller 120 of a setting responsive to the second individual instruction (S804).

The first subordinate controller 120 acquires the setting responsive to the second individual instruction and provides an instruction to prepare for the image formation (S805). In this way, the paper conveyance device 40 and fixing device 50 performs preparation for the image formation, such as preparation for paper conveyance and fixing.

The first controller 100 and second controller 200 perform steps S606 through S616 as described above.

After receiving the completion notification (S616), the first basic controller 110 notifies the first subordinate controller 120 of a notification of no preparation indicating that the paper conveyance and fixing are to be performed in the image formation on the second image former 20 with the image formation preparation not performed on the first image former 10 (S817). After acquiring the notification of no preparation (S818), the first subordinate controller 120 causes the paper conveyance device 40 to start conveying the paper sheet S (S819).

The second subordinate controller 220 causes the second image former 20 to form an image on the incoming paper sheet S (S622).

The first controller 100 and second controller 200 performs operations in S623 through S631 as described above.
Process Performed when Cooperation Instruction Having Same Identification Information is not Received within Predetermined Period of Time In the process in FIGS. 6A and 6B, after one cooperation instruction is received, another cooperation instruction having the same identification information is received within a predetermined period of time. However, the cooperation instructions for the first image I1 and the second image I2 to be superimposed are different in identification information and two cooperation instructions having the same identification information may not be received within the predetermined period of time. For example, the predetermined period of time may be 1 minute.

FIGS. 9A through 9C illustrate an example of the identification information included in the image formation instruction. For example, the original document M created using an application may be the letter A with a silver-color rectangular background as illustrated in FIG. 4. The image formation instruction of the original document M includes the first image formation instruction for the letter A and the second image formation instruction for the silver-color background. The first image formation instruction and second image formation instruction for the original document M created using the one application includes the same identification information as illustrated in FIG. 9A.

If an image of characters and the like created using different applications is formed on a single paper sheet S, the same identification information may not necessarily be included in the two image formation instructions respectively created by the different applications. For example, if the application having created the letter A is different from the application having created the silver-color background, the same identification information is not included, as illustrated in FIG. 9B, in the first image formation instruction to form the image of the letter A on the paper sheet S and in the second image formation instruction to form the image of the silver background on the same paper sheet S.

Similarly, if the image of the letter created on different terminal apparatuses 9 is formed on a single paper sheet S, the same identification information may not necessarily be included in the two image formation instructions respectively output from the different terminal apparatuses 9. For example, if the terminal apparatus 9 having created the letter A is different from the terminal apparatus 9 having created the silver-color background, the same identification information is not included, as illustrated in FIG. 9C, in the first image formation instruction output from one terminal apparatus 9 to form the image of the letter A on the paper sheet S and in the second image formation instruction output from the other terminal apparatus 9 different from the one terminal apparatus 9 to form the silver-color background on the same paper sheet S. Even if the image is created using the same application (such as Microsoft Powerpoint (registered trademark)) with the different terminal apparatuses 9 utilized, the same identification information may not necessarily be included.

In view of the discussion above, the first basic controller 110 performs a process described below if two cooperation instructions having the same identification information are not received within the predetermined period of time.

The storage 114 stores information on a user who has permitted the reception of the cooperation instruction that demands the first image former 10 and second image former 20 to form an image. In other words, the user registers in advance on the image forming apparatus 2 a notification that the user is eligible to provide the image formation instruction to form an image on the first image former 10 and second image former 20. For registration, the user may transmit the notification to the image forming apparatus 2 by operating the terminal apparatus 9 or may enter the notification by operating the UI 70.

FIG. 10 illustrates an example of information stored on the storage 114.

The storage 114 stores, in an associated form, user identification information serving the identification information on the user, method of operation to be performed when an incorrect cooperation instruction is provided (hereinafter referred to as an "irregularity-case operation"), wait time described below, and method of operation to be performed when wait time is exceeded (hereinafter referred to as an "excess-wait-time operation").

The storage 114 also stores an operation that is performed not to accept the cooperation instruction, in other words, an operation that is performed when a cooperation instruction is received from a user whose user identification is not registered (hereinafter referred to as an "unregistered-case operation").

The irregularity-case operation, excess-wait-time operation, and unregistered-case operation may include an operation in which the image formation responsive to a received cooperation instruction is suspended to notify the user of the illegal image formation instruction by displaying on the UI 70 a notification that the image formation instruction is an illegal image formation instruction or may include an operation in which the cooperation instruction is to be handled as an individual operation. The notification is not limited to displaying the illegal image formation instruction on the UI 70. The user may be notified by sound or the notification may be output on the terminal apparatus 9.

If the two image formation instructions having the same identification information are not received within the predetermined period of time, the first basic controller 110 determines whether the user identification information included in the received cooperation instruction is stored beforehand on the storage 114. If the user identification information is stored on the storage 114, the first basic controller 110 determines whether two cooperation instructions having the same user identification information are received within a predetermined wait time. If the two cooperation instructions having the same user identification information are received within the predetermined wait time, the first basic controller 110 determines whether the color compositions of the two cooperation instructions are different from each other. If the color compositions of the two cooperation instructions are different from each other, the first basic controller 110 equalizes the identification information on these two cooperation instructions and performs the process described with reference to FIGS. 6A and 6B. On the other hand, if the color compositions of the two image formation instructions having the same identification information are the same, the first basic controller 110 performs the process in accordance with the setting for the irregularity-case operation stored on the storage 114. For example, the wait time is typically 5 or 10 minutes, but is not limited to any particular period of time.

If the two image formation instructions having the same user identification information are not received within the wait time, the first basic controller 110 operates in accordance with the setting for the excess-wait-time operation stored on the storage 114.

If the user identification information included in the received cooperation instruction is not pre-stored on the storage 114, the first basic controller 110 operates in accordance with the unregistered-case operation stored on the storage 114.

The process of the first basic controller 110 is described with reference to flowcharts.

Figure 11:
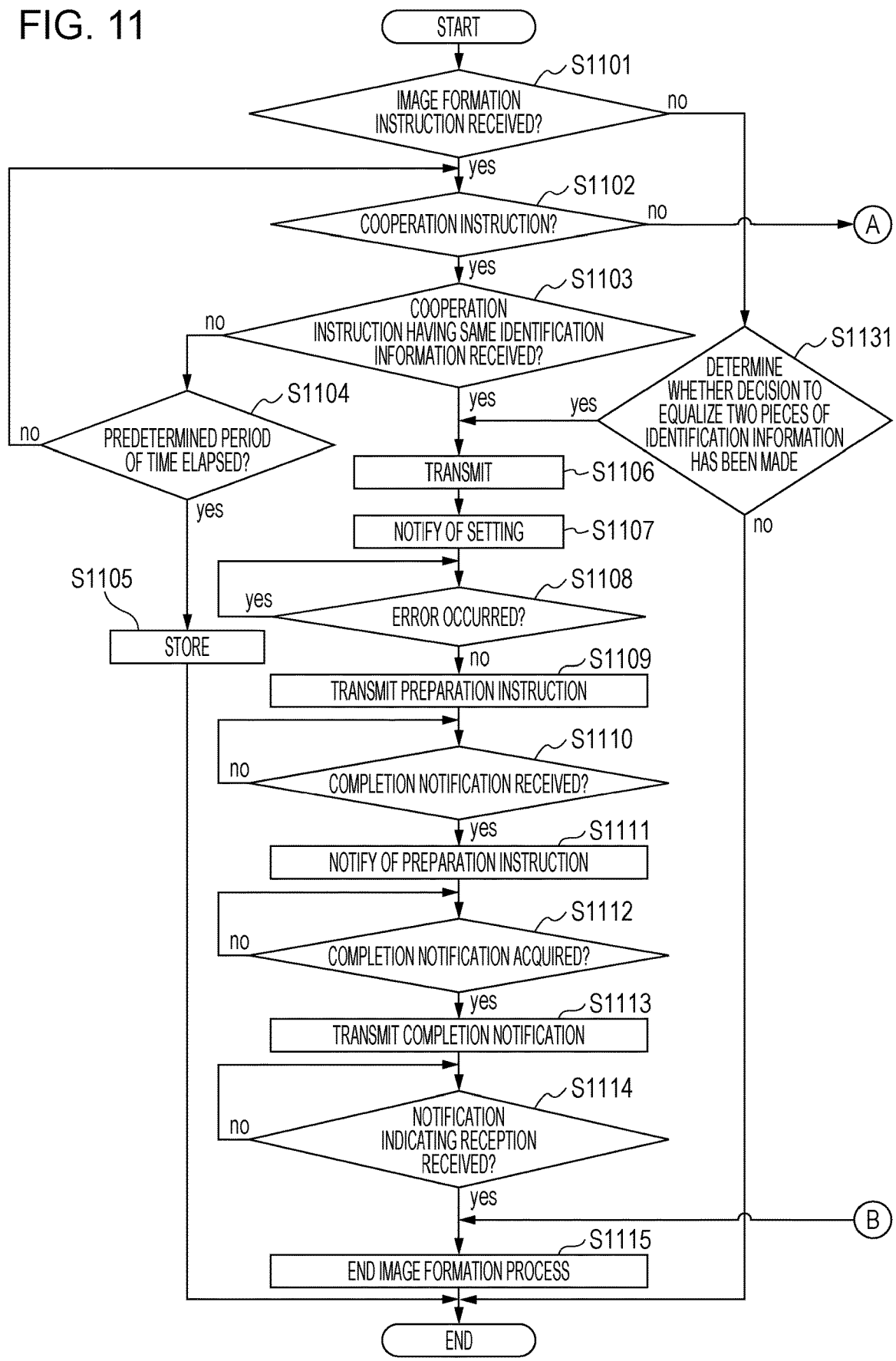
FIG. 11 is a flowchart illustrating an example of a process of the first basic controller.
Figure 12:
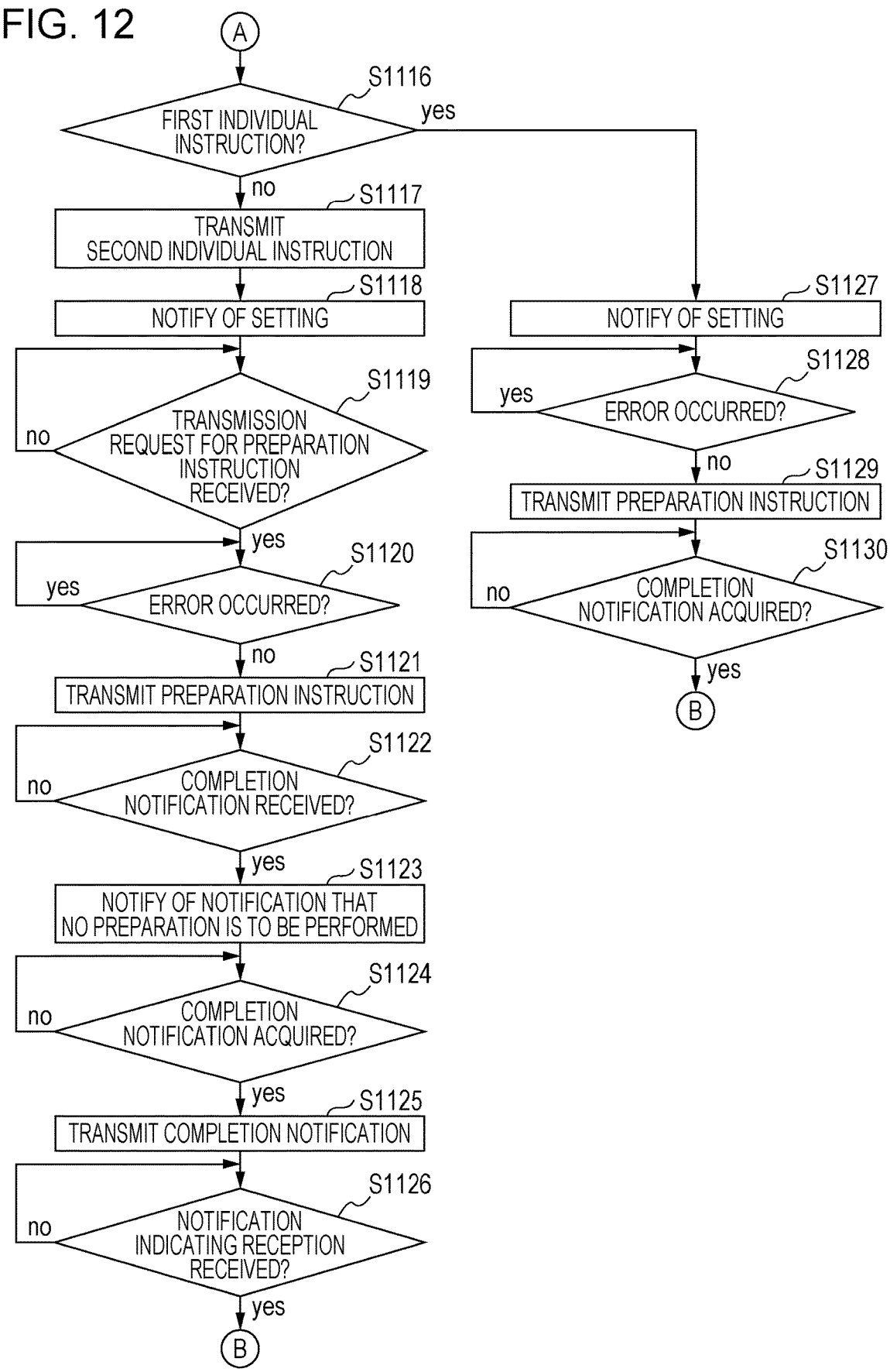
FIG. 12 is a flowchart illustrating an example of a process of the first basic controller.

FIGS. 11 and 12 are the flowcharts illustrating an example of the process of the first basic controller 110. The first basic controller 110 iterates the process every predetermined period of time (for example, every 1 millisecond).

The first basic controller 110 determines whether an image formation instruction has been received from the terminal apparatus 9 via the communication unit 115 (S1101). If the image formation instruction has been received (yes path in S1101), the first basic controller 110 checks whether the image formation instruction is a cooperation instruction or individual information and thus determines whether the cooperation instruction has been received (S1102). If the image formation instruction is a cooperation instruction (yes path in S1102), the first basic controller 110 determines whether another cooperation instruction having the same identification information has been received (S1103). If another cooperation instruction having the same identification information has not been received (no path in S1103), the first basic controller 110 determines whether a predetermined period of time has elapsed (S1104). If the predetermined period of time has not elapsed (no path in S1104), the first basic controller 110 performs operations in S1102 and subsequent operations. On the other hand, if the predetermined period of time has elapsed (yes path in S1104), the first basic controller 110 stores information on the cooperation instruction onto a memory region, such as the RAM 113 or the storage 114 (S1105). The process thus ends.

If another cooperation instruction having the same identification information has been received (yes path in S1103), the first basic controller 110 transmits to the second basic controller 210 a cooperation instruction (an example of the second image formation instruction), corresponding to the second color composition, out of the two image formation instructions having the same identification information (S1106). The first basic controller 110 notifies the first subordinate controller 120 of the setting of the image formation responsive to the cooperation instruction in order to cause the first image former 10 to form the first image I1 in accordance with the cooperation instruction responsive to the first color composition (an example of the first image formation instruction) (S1107). The operation in S1107 corresponds to the operation in S604 described with reference to FIG. 6A.

The first basic controller 110 determines whether an error has occurred (S1108). If an error has occurred (yes path in S1108), the first basic controller 110 waits on standby until the error is resolved. On the other hand, if no error has occurred (no path in S1108), the first basic controller 110 transmits to the second basic controller 210 a preparation instruction indicating that the image formation preparation of the second image former 20 is to be performed (S1109). The operations in S1108 and S1109 respectively correspond to the operations in S606 and S607 described with reference to FIG. 6A.

The first basic controller 110 determines whether a completion notification has been received from the second basic controller 210 (S1110). If the completion notification has not been received (no path in S1110), the first basic controller 110 waits on standby until the completion notification is received. On the other hand, if the completion notification has been received (yes path in S1110 (corresponding to the operation in S616 described with reference to FIG. 6B)), the first basic controller 110 notifies the first subordinate controller 120 of a preparation instruction indicating that the image formation preparation of the first image former 10 is to be performed (S1111). The operation in S1111 corresponds to the operation in step S617 described with reference to FIG. 6B.

The first basic controller 110 determines whether a completion notification indicating the completion of the image formation has been received from the first subordinate controller 120 (S1112). If the completion notification has not been received (no path in S1112), the first basic controller 110 waits on standby until the completion notification is received. On the other hand, if the completion notification has been received (yes path in S1112), the first basic controller 110 transmits to the second basic controller 210 the completion notification indicating the completion of the image formation (S1113). The operation in S1113 corresponds to the operation in S626 described with reference to FIG. 6B.

The first basic controller 110 determines whether a notification indicating the reception of the completion notification has been received from the second basic controller 210 (S1114). If the notification indicating the reception of the completion notification has not been received (no path in S1114), the first basic controller 110 waits on standby until the completion notification is received. On the other hand, if the completion notification has been received (yes path in S1114 (corresponding to the operation in S629 described with reference to FIG. 6B)), the first basic controller 110 ends the image formation process (S1115).

If the image formation instruction is not a cooperation instruction (no path in S1102), the first basic controller 110 determines whether a first individual instruction has been received (S1116). If a first individual instruction has not been received (no path in S1116), the image formation instruction received in S1101 is a second individual instruction. The first basic controller 110 thus transmits the second individual instruction to the second basic controller 210 (S1117). The first basic controller 110 notifies the first subordinate controller 120 of the setting for the image formation responsive to the second individual instruction (S1118). The operation in S1118 corresponds to the operation in S802 described with reference to FIG. 8A. The first basic controller 110 determines whether a transmission request for preparation instruction has been received (S1119). If the transmission request for preparation instruction has not been received (no path in S1119), the first basic controller 110 waits on standby until the transmission request is received. On the other hand, if the transmission request for preparation instruction has been received (yes path in S1119 (corresponding to the operation in S605 described with reference to FIG. 6A)), the first basic controller 110 determines whether an error has occurred (S1120). If an error has occurred (yes path in S1120), the first basic controller 110 waits on standby until the error is resolved. On the other hand, if no error has occurred (no path in S1120), the first basic controller 110 transmits to the second basic controller 210 a preparation instruction indicating that the image formation preparation of the second image former 20 is to be performed (S1121). The operations in S1120 and S1121 correspond to the operations in S606 and S607, respectively, in FIG. 6A.

The first basic controller 110 determines whether a completion notification has been received from the second basic controller 210 (S1122). If the completion notification has not been received (no path in S1122), the first basic controller 110 waits on standby until the completion notification is received. On the other hand, if the completion notification has been received (yes path in S1122 (corresponding to the operation in S616 in FIG. 8B)), the first basic controller 110 transmits to the first subordinate controller 120 a notification that no preparation is to be performed (S1123), and then performs operations in S1124 and subsequent steps. The operation in S1123 corresponds to the operation in S817 in FIG. 8B.

The first basic controller 110 determines whether a completion notification indicating the completion of the image formation has been acquired from the first subordinate controller 120 (S1124). If the completion notification has not been acquired (no path in S1124), the first basic controller 110 waits on standby until the completion notification is acquired. On the other hand, if the completion notification has been acquired (yes path in S1124), the first basic controller 110 transmits to the second basic controller 210 the completion notification indicating the completion of the image formation (S1125). The operation in S1125 corresponds to the operation in S626 described with reference to FIG. 8B.

The first basic controller 110 determines whether the completion notification has been received from the second basic controller 210 (S1126). If the completion notification has not been received (no path in S1126), the first basic controller 110 waits on standby until the completion notification is received. On the other hand, if the completion notification has been received (yes path in S1126 (corresponding to the operation in S629 described with reference to FIG. 8B)), the first basic controller 110 ends the image formation process (S1115).

If the first individual instruction has been received (yes path in S1116), the first basic controller 110 notifies the first subordinate controller 120 of the setting for the image formation responsive to the first individual instruction (S1127). The operation in S1127 corresponds to the operation in S702 described with reference to FIG. 7.

The first basic controller 110 determines whether an error has occurred (S1128). If an error has occurred (yes path in S1128), the first basic controller 110 waits on standby until the error is resolved. If no error has occurred (no path in S1128), the first basic controller 110 notifies the first subordinate controller 120 of a preparation instruction indicating that the image formation preparation of the first image former 10 is to be performed (S1129). The operation in S1129 corresponds to the operation in S705 with reference to FIG. 7.

The first basic controller 110 determines whether the completion notification indicating the completion of the image formation has been acquired from the first subordinate controller 120 (S1130). If the completion notification has not been acquired (no path in S1130), the first basic controller 110 waits on standby until the completion notification is acquired. On the other hand, if the completion notification has been received (yes path in S1130 (corresponding to the operation in S712 described with reference to FIG. 7)), the first basic controller 110 ends the image formation process (S1115).

If the image formation instruction has not been received (no path in S1101), the first basic controller 110 determines whether a decision to equalize two pieces of the identification information, as described below with reference to S1306 in FIG. 13, has been made (S1131). If the decision has not been made (no path in S1131), the first basic controller 110 ends the process. On the other hand, if the decision has been made (yes path in S1131), the first basic controller 110 performs operations in S1106 and subsequent steps. Specifically, the first basic controller 110 transmits to the second basic controller 210 the cooperation instruction (S1106), responsive to the second color composition, out of the two cooperation instructions having the same identification information that the first basic controller 110 has decided to equalize in S1306. In order for the first image former 10 to form the first image I1 in accordance with the cooperation instruction responsive to the first color composition, the first basic controller 110 notifies the first subordinate controller 120 of the setting of the image formation responsive to the cooperation instruction (S1107). The first basic controller 110 then performs operations in step S1108 and subsequent steps.

A combination determination process performed by the first basic controller 110 is described with reference to a flowchart in FIG. 13.

Figure 13:
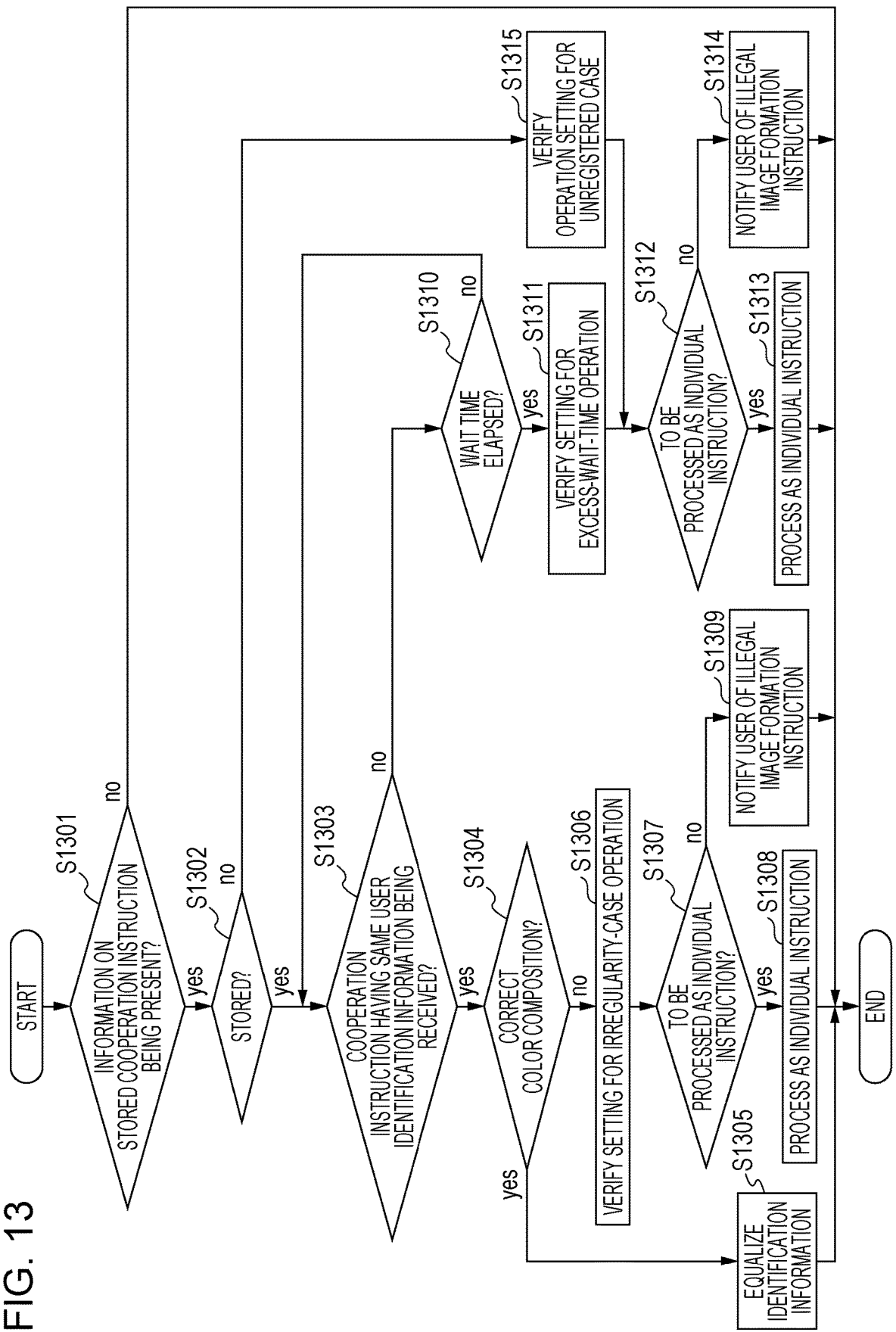
FIG. 13 is a flowchart illustrating an example of a combination determination process of the first basic controller.

FIG. 13 illustrates the flowchart illustrating the combination determination process of the first basic controller 110. The first basic controller 110 iterates the combination determination process every predetermined period of time (for example, every 1 millisecond).

The first basic controller 110 determines whether information on the cooperation instruction is stored on a memory region, such as the RAM 113 or the storage 114 (S1301). If the information is not stored on the memory region (no path in S1301), the first basic controller 110 ends the process. If the information is stored (yes path in S1301), the first basic controller 110 determines whether the user identification information included in the stored cooperation instruction (one cooperation instruction selected from multiple cooperation instructions if the number of stored cooperation instructions is multiple) is stored on the storage 114 (S1302). If the user identification information is stored on the storage 114 (yes path in S1302), the first basic controller 110 determines whether a different cooperation instruction having the user identification information has been received (S1303). When the first basic controller 110 receives the cooperation instruction, the information on the cooperation instruction is stored on the memory region of the RAM 113 or the storage 114 (S1105). In S1303, the first basic controller 110 thus determines whether the different cooperation instruction having the same user identification information is stored on the memory region of the RAM 113 or the storage 114.

If the different cooperation instruction having the same user identification information is received (yes path in S1303), the first basic controller 110 determines whether the color compositions of these two cooperation instructions having the same user identification information are correct or not, in other words, whether the color compositions are different from each other or not (S1304). If the color compositions are correct (yes path in S1304), the first basic controller 110 equalizes the identification information of the two cooperation instructions having the same user identification information (S1305) and ends the process.

If the color compositions are not correct (no path in S1304), the first basic controller 110 verifies the setting of the irregularity-case operation stored in association with the user identification information on the storage 114 (S1306). The first basic controller 110 determines whether the setting of the irregularity-case operation indicates that the cooperation instructions are to be processed as an individual instructions (S1307). If the cooperation instructions are to be processed as an individual instruction (yes path in S1307), the two cooperation instructions are processed as an individual instruction (S1308). Specifically, if the color composition of the two cooperation instructions is the first color composition, operations in S1107 and subsequent steps in FIG. 11 are performed to process as the first individual instruction. If the color composition is the second color composition, operations in S1117 and subsequent steps in FIG. 12 are performed to process as the second individual instruction. If the cooperation instruction is processed as the first individual instruction, the first basic controller 110, after completing the image formation process using the first image former 10 in accordance with one of the two first individual instructions, completes the image formation process using the first image former 10 in accordance with the other first individual instruction. If the cooperation instruction is processed as the second individual instruction, the first basic controller 110 and second basic controller 210, after completing the image formation process using the second image former 20 in accordance with one of the second individual instructions, completes the image formation process using the second image former 20 in accordance with the other second individual instruction.

If the setting of the irregularity-case operation is to suspend the image formation responsive to the received cooperation instruction and to notify the user of an illegal image formation instruction by displaying on the UI 70 a notification that the received cooperation instruction is the illegal image formation instruction, these two cooperation instructions are discarded and the image formation process is suspended. The user is notified that the received cooperation instruction is the illegal image formation instruction (S1309).

If a different cooperation instruction having the same user identification information has not been received (no path in S1303), the first basic controller 110 determines whether the wait time has elapsed (S1310). If the wait time has not elapsed (no path in S1310), the first basic controller 110 performs operations in S1303 and subsequent steps. If the wait time has elapsed (yes path in S1310), the first basic controller 110 verifies the setting of the excess-wait-time operation stored in association with the user identification information on the storage 114 (S1311). The first basic controller 110 then determines whether the setting of the excess-wait-time operation indicates that the cooperation instruction is to be processed as an individual instruction (S1312). If the cooperation instruction is to be processed as an individual instruction (yes path in S1312), the first basic controller 110 processes the cooperation instruction, determined to be stored in S1301, as an individual instruction (S1313). Specifically, the first basic controller 110 performs operations in S1107 and subsequent steps in FIG. 11 to process the cooperation instruction as the first individual instruction if the color composition of the cooperation instruction is the first color composition. On the other hand, if the color composition of the cooperation instruction is the second color composition, the first basic controller 110 performs operations in S1117 and subsequent steps in FIG. 12 to process the cooperation instruction as the second individual instruction. On the other hand, if the cooperation instruction is not to be processed as an individual instruction (no path in S1312), the setting of the excess-wait-time operation indicates that the image formation related to the received cooperation instruction is not performed and is handled as an illegal image formation instruction. The cooperation instruction is thus discarded, the image formation process is suspended, and the user is notified that the cooperation instruction is the illegal image formation instruction (S1314).

If the user identification information is not stored on the storage 114 (no path in S1302), the first basic controller 110 verifies the setting of the unregistered-case operation stored on the storage 114 (S1315). The first basic controller 110 then performs operations in S1312 and subsequent operations to process the cooperation instruction, determined to be stored in S1301, as an individual instruction in accordance with the setting of the unregistered-case operation (S1313) or the first basic controller 110 discards the cooperation instruction, suspends the image formation process, and notifies the user that the cooperation instruction is an illegal image formation process (S1314).

Figure 14:
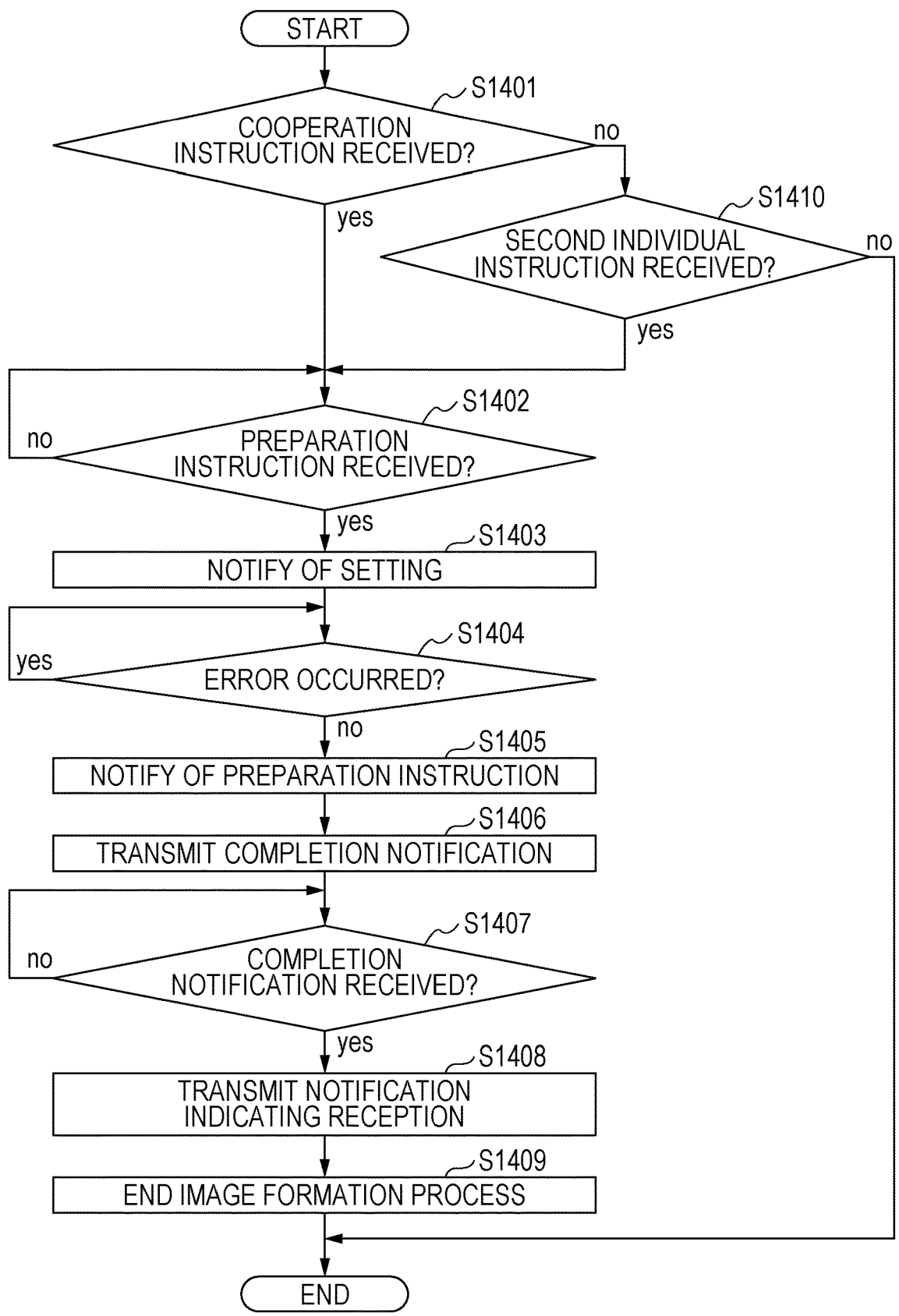
FIG. 14 is a flowchart illustrating an example of a process of a second basic controller.

The process performed by the second basic controller 210 is described with reference to a flowchart. FIG. 14 is a flowchart illustrating an example of the process of the second basic controller 210. The second basic controller 210 iterates the process every predetermined period of time (for example, 1 millisecond).

The second basic controller 210 determines whether a cooperation instruction has been received from the first basic controller 110 (S1401). If the cooperation instruction has been received (yes path in S1401 (corresponding to the operation in S603 described with reference to FIG. 6A)), the second basic controller 210 determines whether a preparation instruction has been received from the first basic controller 110 (S1402). If the preparation instruction has not been received (no path in S1402), the second basic controller 210 waits on standby until the preparation instruction is received. On the other hand, if the preparation instruction has been received (yes path in S1402 (corresponding to the operation in S608 described with reference to FIG. 6A)), the second basic controller 210 notifies the second subordinate controller 220 of the specified setting of the image formation (S1403). The operation in S1403 corresponds to the operation in S609 in FIG. 6A.

The second basic controller 210 determines whether an error has occurred on the second image former 20 (S1404).

The operation in S1404 corresponds to the operation in S611 in FIG. 6A. If an error has occurred (yes path in S1404), the second basic controller 210 waits on standby until the error is resolved. On the other hand, if no error has occurred (no path in S1404), the second basic controller 210 notifies the second subordinate controller 220 a preparation instruction indicating that the image formation preparation of the second image former 20 is to be performed (S1405). The operation in S1405 corresponds to the operation in S612 in FIG. 6A. The second basic controller 210 then transmits a completion notification to the first basic controller 110 (S1406). The operation in S1406 corresponds to the operation in S615 in FIG. 6B.

The second basic controller 210 determines whether a completion notification indicating the completion of the image formation has been received from first basic controller 110 (S1407). If the completion notification has not been received (no path in S1407), the second basic controller 210 waits on standby until a completion notification is received. On the other hand, if a completion notification has been received (yes path in S1407 (corresponding to the operation in S627 in FIG. 6B)), the second basic controller 210 transmits the notification indicating the reception of the completion notification to the first basic controller 110 (S1408). The operation in S1408 corresponds to the operation in S628 in FIG. 6B. The second basic controller 210 thus ends the image formation process (S1409).

If the cooperation instruction has not been received in S1401 (no path in S1401), the second basic controller 210 determines whether the second individual instruction has been received from the first basic controller 110 (S1410). If the second individual instruction has not been received (no path in S1410), the second basic controller 210 ends the process. On the other hand, if the second individual instruction has been received (yes path in S1410 (corresponding to the operation in S803 described with reference to FIG. 8A)), the second basic controller 210 performs operations in S1402 and subsequent steps.

In the exemplary embodiment described above, the process of the first controller 100 is performed by the CPU 111 in the first basic controller 110 and CPU 121 in the first subordinate controller 120 that work cooperatively. The disclosure is not limited to this configuration. For example, the process of the first controller 100 may be carried out by a single processor or three or more processors. According to the exemplary embodiment, likewise, the process of the second controller 200 is performed by the CPU 211 in the second basic controller 210 and the CPU 221 in the second subordinate controller 220 that work cooperatively. The disclosure is not limited to this configuration. For example, the process of the second controller 200 may be carried out by a single processor or three or more processors. The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The image forming apparatus 2 includes the CPU 111 and CPU 121 as examples of first processors that control the first image former 10 that forms the first image I1 using toner as an example of the color material having the first color composition. The image forming apparatus 2 also includes the CPU 211 and CPU 221 as examples of second processors that control the second image former 20 that forms, using toner having the second color composition, the second image I2 to be superimposed to the first image I1.

If an image formation instruction including information indicating that the first image I1 and the second image I2 are to be superimposed is received with a first different image formation instruction having the same identification information being received, the first processor causes the first image former 10 to form the first image I1 in accordance with a first image formation instruction, responsive to the first color composition, out of the image formation instruction and the first different image formation instruction (S621). The first processor transmits to the second processor a second image formation instruction, responsive to the second color composition, out of the image formation instruction and the first different image formation instruction (S602). The second processor causes the second image former 20 to form the second image I2 in accordance with the second image formation instruction (S622).

If the image formation instruction including information indicating that the first image I1 and the second image I2 are to be superimposed is received with the first different image formation instruction having the same identification information not being received, the following process is performed. Specifically, if a second different image formation instruction is received with the second different image formation instruction including the same user identification information as the user identification information that is on a user having transmitted the image formation instruction and is included in the image formation instruction (yes path in S1303 in FIG. 13), the first processor causes the first image former 10 to form the first image I1 in accordance with a first image formation instruction, responsive to the first color composition, out of the image formation instruction and the second different image formation instruction (operations in S702 and subsequent steps in FIG. 7). The first processor transmits to the second processor a second image formation instruction responsive to the second color composition (S1106 in FIG. 11 and S802 in FIG. 8A). The second processor causes the second image former 20 to form the second image I2 in accordance with the second image formation instruction (operations in S609 and subsequent steps in FIG. 8A).

When two pieces of the identification information on the two image formation instructions demanding images to be superimposed on a single paper sheet S are not the same, the image forming apparatus 2 may superimpose the two images on each other.

If the second different image formation instruction has not been received for a predetermined period of time since the reception of the image formation instruction (yes path in S1310), the first processor performs an operation responsive to the image formation instruction in accordance with a predetermined setting associated with the user identification information (S1311 through S1314).

If the setting stored on the storage 114 indicates that the image formation instruction is processed as an illegal image formation instruction, the first processor notifies the user of the illegal image formation instruction (S1314).

If the setting stored on the storage 114 indicates that only the first image I1 or only the second image I2 is to be formed without being superimposed on the single paper sheet S, the first processor forms an image, having the color composition included in the image formation instruction, out of the first image I1 and the second image I2 (S1313).

If the color composition responsive to the image formation instruction is the same as the color composition responsive to the second different image formation instruction (no path in S1304), the first processor performs the operations (S1306 through S1309) responsive to the image formation instruction and the second different image formation instruction in accordance with the predetermined setting associated with the user identification information.

For example, if the setting stored on the storage 114 indicates that the image formation instruction is processed as the illegal image formation instruction, the first processor notifies the user of the illegal image formation instruction (S1309).

If the setting stored on the storage 114 indicates that only the first image I1 or only the second image I2 is to be formed without being superimposed on the single paper sheet S, with the image formation instruction and the second different image formation instruction being the first color composition, the first processor causes the first image former 10 to form the first image I1 (operations in S702 and subsequent steps in FIG. 7). With the image formation instruction and the second different image formation instruction being the second color composition, the first processor transmits the image formation instruction and the second different image formation instruction to the second processor (S1117). The second processor causes the second image former 20 to form the second image I2 in accordance with the image formation instruction responsive to the second color composition (operations in S609 and subsequent steps in FIG. 8A).

Each program to be executed by the CPU 111 in the first basic controller 110, CPU 121 in the first subordinate controller 120, CPU 211 in the second basic controller 210, and CPU 221 in the second subordinate controller 220 may be delivered in a recorded state on one of computer readable recording media. The computer readable recording media include a magnetic recording medium (magnetic tape or magnetic disk), optical recording medium (optical disk), magneto-optical recording medium, and semiconductor recording memory. The program may be downloaded via a communication medium, such as the Internet.

The program causes the first processer and second processor to perform functions described below. The first processor is configured to control the first image former 10 that forms the first image I1 using the color material of the first color composition. If an image formation instruction including information indicating that the first image I1 is to be superimposed onto the second image I2 that the second image former 20 forms using the color material of the second color composition is received, with a first different image formation instruction having the same identification information being received, the first processor: causes the first image former 10 to form the first image I1 in accordance with a first image formation instruction, responsive to the first color composition, out of the image formation instruction and the first different image formation instruction; and transmits a second image formation instruction responsive to the second color composition to the second processor that is configured to control the second image former 20.

The program of the exemplary embodiment of the disclosure causes the second processor to perform a function to cause the second image former 20 to form the second image I2 in accordance with the second image formation instruction.

According to the program of the exemplary embodiment, if the image formation instruction including the information indicating that the first image I1 and the second image I2 are to be superimposed is received, with the first different image formation instruction having the same identification information not being received while with a second different image formation instruction being received, the second different image formation including the same user identification information as the user identification information that is on the user having transmitted the image formation instruction and is included in the image formation instruction, the first processor: causes the first image former 10 to form the first image I1 in accordance with a first image formation instruction, responsive to the first color composition, out of the image formation instruction and the second different image formation instruction; and transmits a second image formation instruction, responsive to the second color composition, to the second processor that is configured to control the second image former 20.

The program of the exemplary embodiment causes the second processor to perform a function to cause the second image former 20 to form the second image I2 in accordance with the second image formation instruction.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a first processor configured to control a first image former that forms a first image using a color material having a first color composition; and
   a second processor configured to control a second image former that forms, using a color material having a second color composition, a second image to be superimposed on the first image,
   wherein the first processor is configured to:
      if an image formation instruction, including information indicating that the first image and the second image are to be superimposed to each other is received, with a first different image formation instruction being received, the first different image formation instruction having identification information identical to identification information for the image formation instruction;
      cause the first image former to form the first image in accordance with a first image formation instruction, corresponding to the first color composition, out of the image formation instruction and the first different image formation instruction, and
      transmit to the second processor a second image formation instruction corresponding to the second color composition, and
   the second processor is configured to cause the second image former to form the second image in accordance with the second image formation instruction, and
   wherein the first processor is configured to:
      if the image formation instruction, including the information indicating that the first image and the second image are to be superimposed to each other, is received, with the first different image formation instruction having the identical identification information not being received, while with a second different formation instruction being received, the second different formation instruction having user identification information identical to user identification information that is on a user having transmitted the image formation instruction and is included in the image formation instruction;

cause the first image former to form the first image in accordance with a first image formation instruction, corresponding to the first color composition, out of the image formation instruction and the second different image formation instruction; and transmit to the second processor a second image formation instruction corresponding to the second color composition, and the second processor is configured to cause the second image former to form the second image in accordance with the second image formation instruction.

2. The image forming apparatus according to claim 1, wherein the first processor is configured to, if the second different image formation instruction is not received within a predetermined period of time from reception of the image formation instruction, perform an operation for the image formation instruction in accordance with a setting predetermined in association with the user identification information.

3. The image forming apparatus according to claim 2, wherein the first processor is configured to, if the setting indicates a processing of an illegal image formation instruction, notify a user of the illegal image formation instruction.

4. The image forming apparatus according to claim 2, wherein the first processor is configured to, if the setting indicates that only the first image or only the second image is to be formed with the first image and the second image not superimposed to each other on a single paper sheet, cause an image to be formed, the image, having a color composition included in the image formation instruction, out of the first image and the second image.

5. The image forming apparatus according to claim 1, wherein the first processor is configured to, if the color composition corresponding to the image formation instruction is identical to the color composition corresponding to the second different image formation instruction, perform an operation for the image formation instruction and the second different image formation instruction in accordance with a setting predetermined in association with the user identification information.

6. The image forming apparatus according to claim 5, wherein the first processor is configured to, if the setting indicates a processing of an illegal image formation instruction, notify a user of the illegal image formation instruction.

7. The image forming apparatus according to claim 5, wherein the first processor is configured to, if the setting indicates that only the first image or only the second image is to be formed with the first image and the second image not superimposed to each other on a single paper sheet, cause the first image former to form the first image with the image formation instruction and the second different image formation instruction having the first color composition or transmit to the second processor the image formation instruction and the second different image formation instruction with the image formation instruction and the second different image formation instruction having the second color composition, and wherein the second processor is configured to cause the second image former to form the second image in accordance with an image formation instruction corresponding to the second color composition.

8. A non-transitory computer readable medium storing a program causing a computer to execute a process, the process comprising:

controlling a first image former that forms a first image using a color material having a first color composition;

controlling a second image former that forms, using a color material having a second color composition, a second image to be superimposed on the first image;

if an image formation instruction, including information indicating that the first image and the second image are to be superimposed to each other is received, with a first different image formation instruction being received, the first different image formation instruction having identification information identical to identification information for the image formation instruction, causing the first image former to form the first image in accordance with a first image formation instruction, corresponding to the first color composition, out of the image formation instruction and the first different image formation instruction;

transmitting to the second processor a second image formation instruction corresponding to the second color composition; and causing the second image former to form the second image in accordance with the second image formation instruction, and if the image formation instruction, including the information indicating that the first image and the second image are to be superimposed to each other, is received, with the first different image formation instruction having the identical identification information not being received, while with a second different formation instruction being received, the second different formation instruction having user identification information identical to user identification information that is on a user having transmitted the image formation instruction and is included in the image formation instruction, causing the first image former to form the first image in accordance with a first image formation instruction, corresponding to the first color composition, out of the image formation instruction and the second different image formation instruction, transmitting to the second processor a second image formation instruction corresponding to the second color composition, and causing the second image former to form the second image in accordance with the second image formation instruction.

9. An image forming method comprising:

controlling a first image former that forms a first image using a color material having a first color composition;

controlling a second image former that forms, using a color material having a second color composition, a second image to be superimposed on the first image, if an image formation instruction, including information indicating that the first image and the second image are to be superimposed to each other is received, with a first different image formation instruction being received, the first different image formation instruction having identification information identical to identification information for the image formation instruction, causing the first image former to form the first image in accordance with a first image formation instruction, corresponding to the first color composition, out of the image formation instruction and the first different image formation instruction, transmitting to the second processor a second image formation instruction corresponding to the second color composition, and causing the second image former to form the second image in accordance with the second image formation instruction; and if the image formation instruction, including the information indicating that the first image and the second image are to be superimposed to each other, is received, with the first different image formation instruction having the identical identification information not being received, while with a second different formation instruction being received, the second different formation instruction having user identification information identical to user identification information that is on a user having transmitted the image formation instruction and is included in the image formation instruction, causing the first image former to form the first image in accordance with a first image formation instruction, corresponding to the first color composition, out of the image formation instruction and the second different image formation instruction, transmitting to the second processor a second image formation instruction corresponding to the second color composition, and causing the second image former to form the second image in accordance with the second image formation instruction.

* * * * *